(12) United States Patent
Cotoros et al.

(10) Patent No.: US 11,025,809 B2
(45) Date of Patent: Jun. 1, 2021

(54) DUAL IMAGING MODULE CAMERAS

(71) Applicant: GoPro, Inc., San Mateo, CA (US)

(72) Inventors: Ingrid A. Cotoros, San Mateo, CA (US); Robert George Hoffman, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 196 days.

(21) Appl. No.: 16/419,303

(22) Filed: May 22, 2019

(65) Prior Publication Data

US 2020/0374434 A1    Nov. 26, 2020

(51) Int. Cl.
*H04N 5/225* (2006.01)
*H04N 5/232* (2006.01)
*G02B 7/02* (2021.01)

(52) U.S. Cl.
CPC ........... *H04N 5/2258* (2013.01); *G02B 7/021* (2013.01); *H04N 5/2253* (2013.01); *H04N 5/2254* (2013.01); *H04N 5/23296* (2013.01)

(58) Field of Classification Search
CPC .. H04N 5/2258; H04N 5/2253; H04N 5/2254; H04N 5/23296; H04N 5/35721; H04N 9/04519; G02B 7/021
See application file for complete search history.

(56) References Cited

U.S. PATENT DOCUMENTS

| 2011/0069151 A1* | 3/2011 | Orimoto | H04N 13/239 348/42 |
| 2018/0077404 A1* | 3/2018 | Bechtel | H04N 5/2254 |
| 2018/0376122 A1* | 12/2018 | Park | H04N 13/239 |

OTHER PUBLICATIONS

Gil Abraham , "Triple Cameras: Are Three Better Than Two?" core photonics, Apr. 2018, 12 pages.

* cited by examiner

*Primary Examiner* — Nicholas G Giles
(74) *Attorney, Agent, or Firm* — Young Basile Hanlon & MacFarlane, P.C.

(57) ABSTRACT

Systems and methods are disclosed for dual imaging module cameras. For example, methods may include: receiving a zoom control signal, receiving an input image that was captured using a first lens assembly of a dual imaging module, and determining, based on the zoom control signal, an intermediate lens distortion profile. The intermediate lens distortion profile has values that are between corresponding values of a first lens distortion profile for the first lens assembly and a second lens distortion profile for a second lens assembly of the dual imaging module. The method may include applying a warp based on the intermediate lens distortion profile to the input image to obtain an output image and transmitting, storing, or displaying an image based on the output image. For example, the systems and methods may eliminate or mitigate discontinuities in lens distortion at a switch-over between lens assemblies of a dual imaging module.

20 Claims, 14 Drawing Sheets

DUAL IMAGING MODULE CAMERAS

TECHNICAL FIELD

This disclosure relates to dual imaging module cameras.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, a dual imaging module, including two lens assemblies, is used to capture images at wide range of zoom levels while maintaining a high pixel resolution.

SUMMARY

Disclosed herein are implementations of dual imaging module cameras.

In a first aspect, the subject matter described in this specification can be embodied in systems that include: a first lens assembly including a first stack of one or more lenses and a first image sensor configured to capture images in a first field of view; a second lens assembly, attached to the first lens assembly, including a second stack of one or more lenses and a second image sensor configured to capture images in a second field of view that is a subset of the first field of view; and a processing apparatus configured to: receive a zoom control signal; receive an input image that was captured using the first image sensor; determine, based on the zoom control signal, an intermediate lens distortion profile, wherein the intermediate lens distortion profile has values that are between corresponding values of a first lens distortion profile for the first stack of one or more lenses and a second lens distortion profile for the second stack of one or more lenses; and apply a warp based on the intermediate lens distortion profile to the input image to obtain an output image.

In a second aspect, the subject matter described in this specification can be embodied in methods that include: receiving a zoom control signal; receiving an input image that was captured using a first lens assembly of a dual imaging module; determining, based on the zoom control signal, an intermediate lens distortion profile, wherein the intermediate lens distortion profile has values that are between corresponding values of a first lens distortion profile for the first lens assembly and a second lens distortion profile for a second lens assembly of the dual imaging module; applying a warp based on the intermediate lens distortion profile to the input image to obtain an output image; and transmitting, storing, or displaying an image based on the output image.

In a third aspect, the subject matter described in this specification can be embodied in a non-transitory computer-readable storage medium. The non-transitory computer-readable storage medium may include executable instructions that, when executed by a processor, cause performance of operations, including: receiving a zoom control signal; receiving an input image that was captured using a first lens assembly of a dual imaging module; determining, based on the zoom control signal, an intermediate lens distortion profile, wherein the intermediate lens distortion profile has values that are between corresponding values of a first lens distortion profile for the first lens assembly and a second lens distortion profile for a second lens assembly of the dual imaging module; applying a warp based on the intermediate lens distortion profile to the input image to obtain an output image; and transmitting, storing, or displaying an image based on the output image.

In a fourth aspect, the subject matter described in this specification can be embodied in systems that include: a first lens assembly including a first stack of one or more lenses and a first image sensor configured to capture images in a first field of view; a second lens assembly, attached to the first lens assembly, including a second stack of one or more lenses and a second image sensor configured to capture images in a second field of view that is a subset of the first field of view; and a processing apparatus configured to: receive a zoom control signal; receive an input image that was captured using the second image sensor; determine, based on the zoom control signal, an intermediate lens distortion profile, wherein the intermediate lens distortion profile has values that are between corresponding values of a first lens distortion profile for the first stack of one or more lenses and a second lens distortion profile for the second stack of one or more lenses; and apply a warp based on the intermediate lens distortion profile to the input image to obtain an output image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
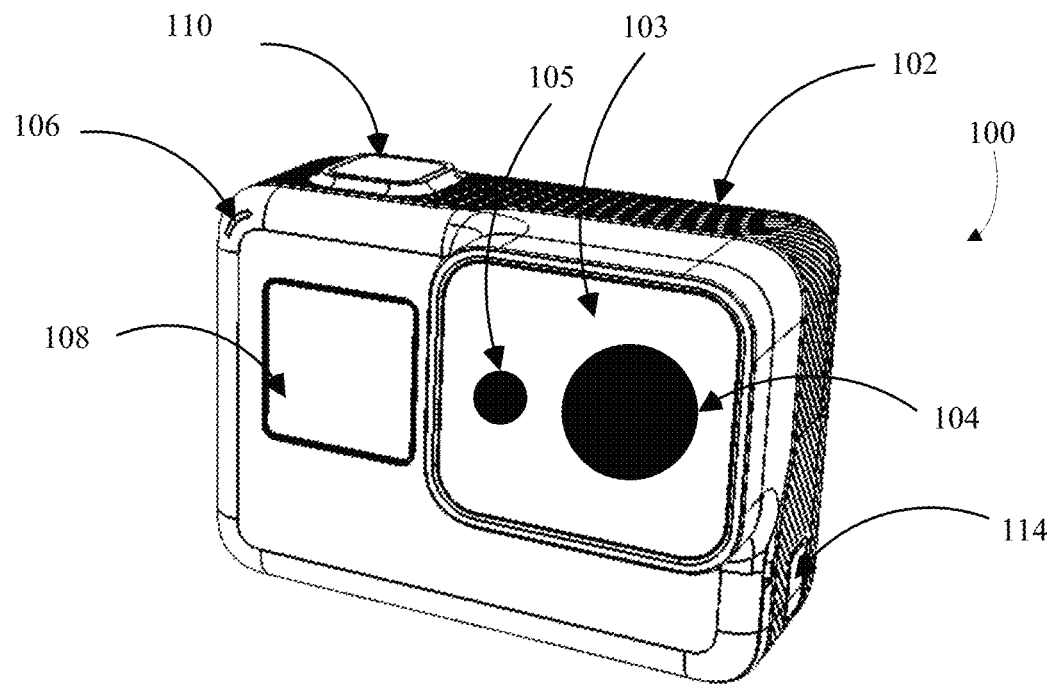
FIGS. 1A-D are isometric views of an example of an image capture device including a dual imaging module.
Figure 1B:
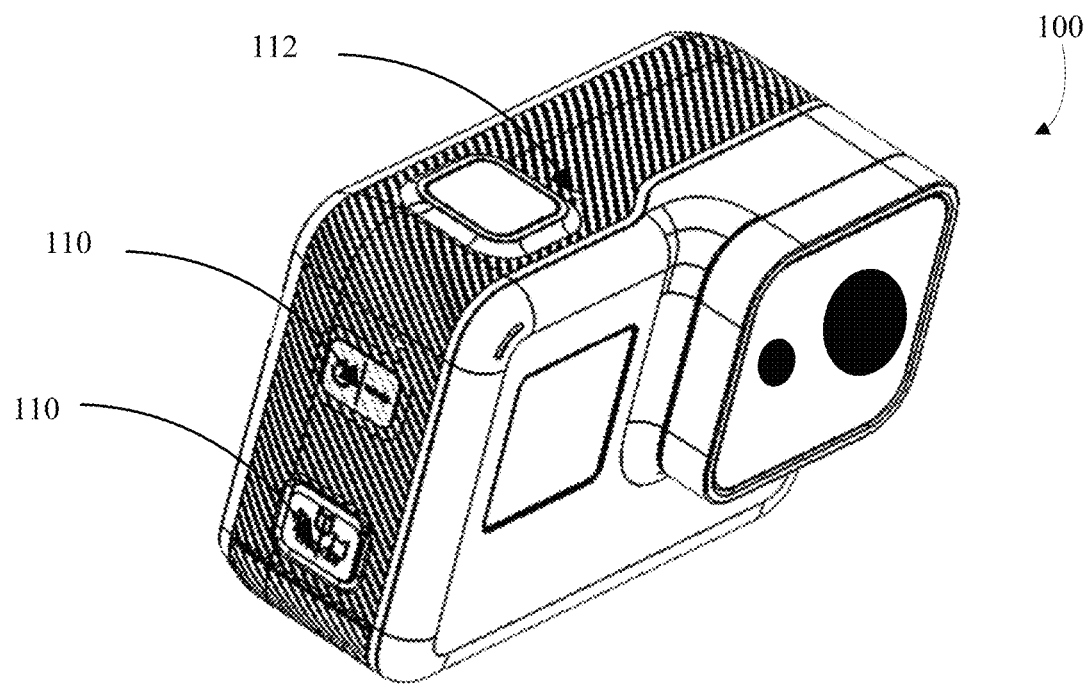
Figure 1C:
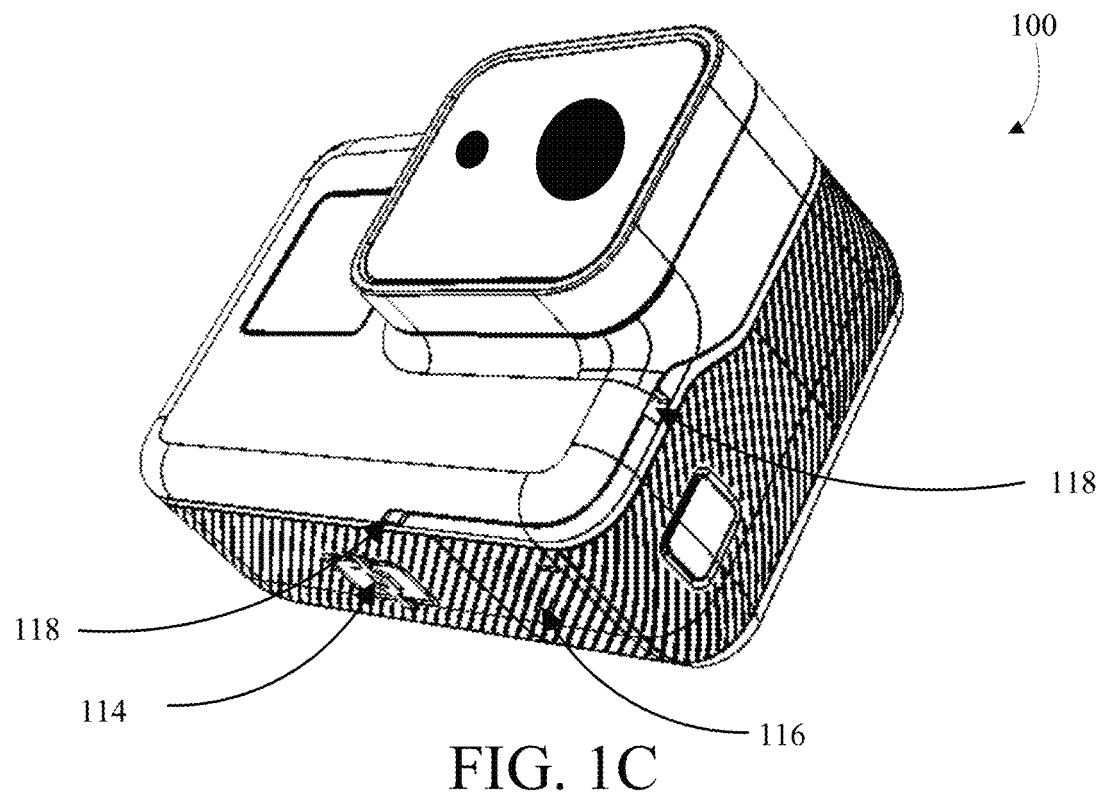
Figure 1D:
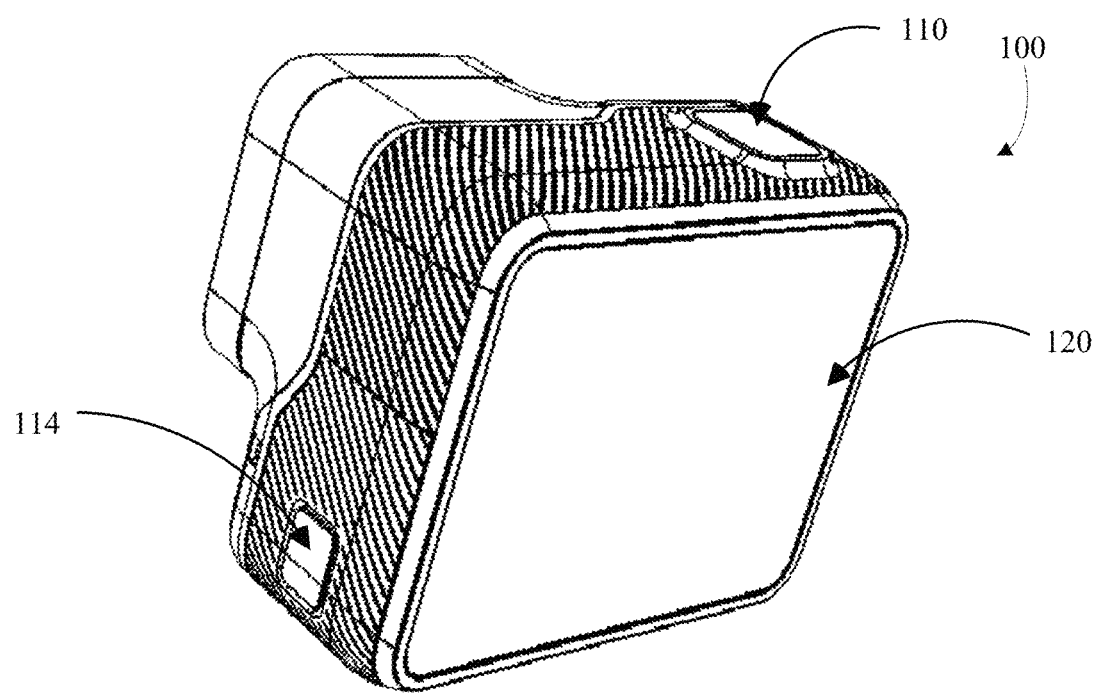

Systems and methods for dual imaging module cameras are described herein. Dual imaging module cameras offer a path to allow for 1. Zoom to smaller field of view (FOV) while maintaining a high resolution; and 2. Achieving depth of focus effects (e.g., bokeh). One of the main problems to be addressed is a seamless transition between the two imaging modules, or lens assemblies, of the dual imaging module when dealing with very dissimilar distortions in the lenses.

Traditional wide-angle lenses carry a barrel distortion, meaning a rectangular FOV is projected as a barrel shape through the lens onto the sensor. Linear lenses (e.g., Rectilinear or Normal Distortion lenses) on the other hand, project a rectangular FOV as a rectangle on a sensor. When zooming on a traditional imaging module up to a "switchover" FOV or transition FOV, and then switching over to a secondary module employing a linear lens, the "switch over" FOV, zoom transition into it, and zoom transition from it may be managed to eliminate or mitigate any abrupt discontinuities in the lens distortion shown in the captured images. This may be achieved by warping the input images using intermediate FOVs to achieve:

- a smooth transition from a barrel distortion to a linear distortion while zooming on lens assembly #1—starting either at full FOV or at some intermediate FOV, and ending at a linear distortion either at some intermediate FOV or at the "switch-over" FOV;
- a smooth transition from a pincushion distortion to a linear distortion while on lens assembly #2—starting either at the full FOV or at some intermediate FOV, and ending at a linear distortion either at some intermediate FOV or at the max zoom FOV supported; or
- a smooth transition using a combination of the above.

FIGS. 1A-D are isometric views of an example of an image capture device 100. The image capture device 100 may include a body 102 having a dual imaging module 103 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the dual imaging module 103 and/or performing other functions. The image capture device 100 may be configured to capture images and video and to store captured images and video for subsequent display or playback.

The dual imaging module 103 includes a first lens assembly including a first stack of one or more lenses including a first outer lens 104, and a second lens assembly including a second stack of one or more lenses including a second outer lens 105. The first lens assembly includes a first stack of one or more lenses and a first image sensor configured to capture images in a first field of view. The second lens assembly includes a second stack of one or more lenses and a second image sensor configured to capture images in a second field of view. The second field of view may be a subset of the first field of view. For example, the first outer lens 104 may be a wide-angle lens (e.g., a hyper-hemispherical lens (greater than 180° FOV), a spherical lens, or a fisheye lens (very wide FOV lens with less than or equal to 180° FOV)), and the second outer lens 105 may be a rectilinear lens that results in a relatively narrow field of view for the second lens assembly. The first lens assembly may be attached to the second lens assembly as part of the structure of the dual imaging module 103 in a fixed relative orientation. For example, the first lens assembly and the second lens assembly of the dual imaging module may be oriented with substantially parallel optical axes. For example, the first outer lens 104 may have a diameter of 13 mm, the second outer lens 105 may have a diameter of 3 mm, and the first outer lens 104 and the second outer lens 105 may be spaced 15 mm apart laterally. For example, the first field of view may be twice as large as the second field of view. For example, the dual imaging module 103 may be the dual imaging module 200 of FIG. 2.

The dual imaging module 103 may be used to capture image at wide range of zoom levels while maintaining high resolution, where the first lens assembly with a relatively wide field of view is used at low zoom levels and the second lens assembly with a relatively narrow field of view is used to capture at high zoom levels. Because the two lens assemblies of the dual imaging module 103 may have different lens distortion profiles the transition between use of the two lens assemblies for image capture as a zoom level is changed may cause an abrupt change in lens distortion. This abrupt change in lens distortion may be avoided or mitigated by applying warp functions based on intermediate lens distortion profiles that depend on the zoom level to more gradually change the effective lens distortion of the images captured as the zoom level is adjusted. For example, the image capture device 100 may implement the process 1000 of FIG. 10.

The image capture device 100 may include various indicators, including LED lights 106 and LED display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the dual imaging module 103 that is configured to receive light incident upon the first outer lens 104 and/or the second outer lens 105 and to direct received light onto an image sensor internal to the respective lens assemblies of the two lenses (104 and 105).

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
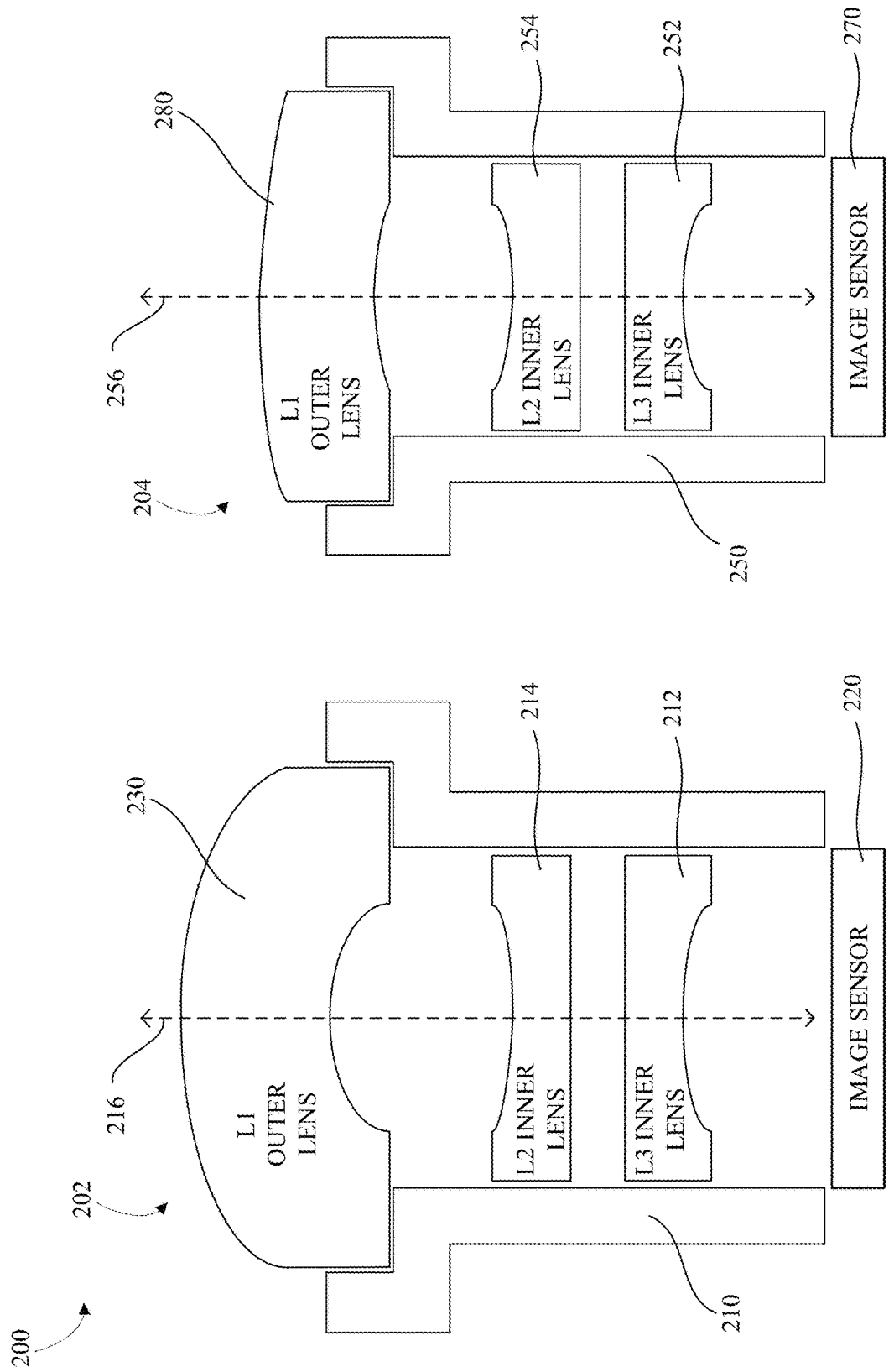
FIG. 2 is a cross-sectional view of a pair of lens assemblies of an example of a dual imaging module.

FIG. 2 is a cross-sectional view of a pair of lens assemblies (202 and 204) of an example of a dual imaging module 200. The dual imaging module 200 includes a first lens assembly 202 including a first stack of one or more lenses (212, 214, and 230) and a first image sensor 220 configured to capture images in a first field of view. The dual imaging module 200 includes a second lens assembly 204 including a second stack of one or more lenses (252, 254, and 280) and a second image sensor 270 configured to capture images in a second field of view. The first lens assembly 202 includes a lens barrel 210 configured to hold the outer lens 230 and multiple inner lenses (212 and 214) in alignment along an optical axis 216 over the image sensor 220, to direct light incident on the outer lens 230 onto the image sensor 220 for image capture. The second lens assembly 204 includes a lens barrel 250 configured to hold the outer lens 280 and multiple inner lenses (252 and 254) in alignment along an optical axis 256 over the image sensor 270, to direct light incident on the outer lens 280 onto the image sensor 270 for image capture. For example, the second lens assembly 204 may be attached to the first lens assembly 202 via a body of an image capture device (not explicitly shown in FIG. 2) in a fixed orientation relative to each other. For example, the optical axis 216 may be parallel to the optical axis 256. For example, the second field of view may be a subset of the first field of view (e.g., twice as large with approximately the same optical center beyond an expected typical distance from the dual imaging module 200). For example, the dual imaging module 200 may be implemented as part of an image capture device, such as the image capture device 100 of FIG. 1, the image capture device 310 of FIG. 3A, or the image capture device 340 of FIG. 3B.

The first lens assembly 202 includes a lens barrel 210 in a body of an image capture device (e.g., the image capture device 100). The lens barrel 210 may be an integrated part of a body of an image capture device. The lens barrel 210 includes multiple inner lenses (212 and 214). The lens barrel 210 attaches to a curved inner lens 212. The curved inner lens 212 may refract light propagating through the lens barrel 210 to focus the light for capture by the image sensor 220. The lens barrel 210 attaches to a second curved inner lens 214. The lens barrel 210 attaches to an outer lens 230. For example, the lenses (212, 214, and 230) may be attached (e.g., using glue and/or ledges and flanges (not shown)) to inner walls of the lens barrel 210. The lenses (212, 214, and 230) may be oriented to direct light from a first end of the lens barrel 210, roughly parallel to an optical axis 216 of the lens barrel 210 to a second end of the lens barrel 210, where the light may be detected by the image sensor 220 to capture an image. For example, the outer lens 230 may be a wide-angle lens (e.g., a hyper-hemispherical lens, a spherical lens, or a fisheye lens), which may cause the first field of view of the first lens assembly 202 to be wide (e.g., 180 degrees).

The second lens assembly 204 includes a lens barrel 250 in a body of an image capture device (e.g., the image capture device 100). The lens barrel 250 may be an integrated part of a body of an image capture device. The lens barrel 250 includes multiple inner lenses (252 and 254). The lens barrel 250 attaches to a curved inner lens 252. The curved inner lens 252 may refract light propagating through the lens barrel 250 to focus the light for capture by the image sensor 270. The lens barrel 250 attaches to a second curved inner lens 254. The lens barrel 250 attaches to an outer lens 280. For example, the lenses (252, 254, and 280) may be attached (e.g., using glue and/or ledges and flanges (not shown)) to inner walls of the lens barrel 250. The lenses (252, 254, and 280) may be oriented to direct light from a first end of the lens barrel 250, roughly parallel to an optical axis 256 of the lens barrel 250 to a second end of the lens barrel 250, where the light may be detected by the image sensor 270 to capture an image. For example, the outer lens 280 may be a rectilinear lens, which may cause the second field of view of the second lens assembly 204 to be relatively narrow (e.g., on the order of 70 to 90 degrees).

The first lens assembly 202 includes the image sensor 220 mounted within a body of an image capture device at a second end of the lens barrel 210. The image sensor 220 may be configured to capture images based on light incident on the image sensor 220 through the outer lens 230 and the multiple inner lenses 212 and 214. The image sensor 220 may be configured to detect light of a certain spectrum (e.g., the visible spectrum or the infrared spectrum) and convey information constituting an image as electrical signals (e.g., analog or digital signals). For example, the image sensor 220 may include charge-coupled devices (CCD) or active pixel sensors in complementary metal-oxide-semiconductor (CMOS). In some implementations, the image sensor 220 includes a digital to analog converter. For example, the image sensor 220 may be configured to capture image data using a plurality of selectable exposure times.

The second lens assembly 204 includes the image sensor 270 mounted within a body of an image capture device at a second end of the lens barrel 250. The image sensor 270 may be configured to capture images based on light incident on the image sensor 270 through the outer lens 280 and the multiple inner lenses 252 and 254. The image sensor 270 may be configured to detect light of a certain spectrum (e.g., the visible spectrum or the infrared spectrum) and convey information constituting an image as electrical signals (e.g., analog or digital signals). For example, the image sensor 270 may include charge-coupled devices (CCD) or active pixel sensors in complementary metal-oxide-semiconductor (CMOS). In some implementations, the image sensor 270 includes a digital to analog converter. For example, the image sensor 270 may be configured to capture image data using a plurality of selectable exposure times.

Figure 3:
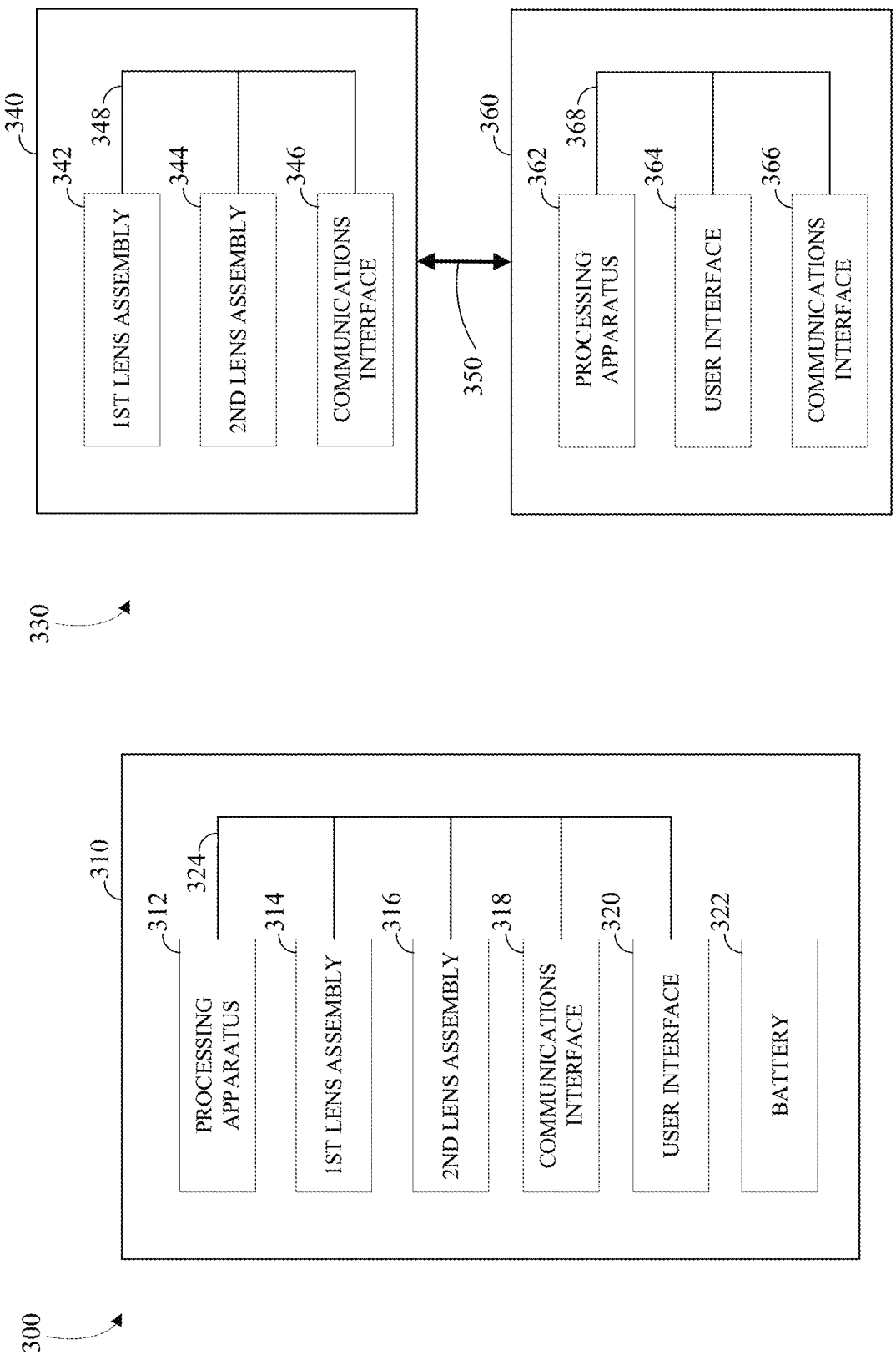
FIGS. 3A-B are block diagrams of examples of image capture systems.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D.

The image capture device 310 includes a processing apparatus 312 that is configured to receive images captured using a first lens assembly 314 and/or a second lens assembly 316. The processing apparatus 312 may be configured to perform image signal processing (e.g., filtering, tone mapping, stitching, and/or encoding) to generate output images based on image data from the first lens assembly 314 and/or the second lens assembly 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

An image sensor of the first lens assembly 314 and an image sensor of the second lens assembly 316 may be configured to detect light of a certain spectrum (e.g., the visible spectrum or the infrared spectrum) and convey information constituting an image as electrical signals (e.g., analog or digital signals). For example, the image sensors may include CCDs or active pixel sensors in a CMOS. The image sensors may detect light incident through a respective lens (e.g., hyper-hemispherical lens, a fisheye lens, or a rectilinear lens). In some implementations, the image sensors of the first lens assembly 314 and the second lens assembly 316 include digital-to-analog converters. The first lens assembly 314 and the second lens assembly 316 may be attached (e.g., via a body of the image capture device 310) and held in a fixed orientation with respective fields of view that overlap. For example, a second field of view of the second lens assembly 316 may be a subset of a first field of view of the first lens assembly 314. For example, the first lens assembly 314 and the second lens assembly 316 may be components of a dual imaging module (e.g., the dual imaging module 200 of FIG. 2).

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures. For example, the user interface 320 may include a zoom control dial or lever. For example, the user interface 320 may include a touchscreen display, which may present a virtual slider for entering zoom control commands.

The battery 322 may power the image capture device 310 and/or its peripherals. For example, the battery 322 may be charged wirelessly or through a micro-USB interface.

Figure 10:
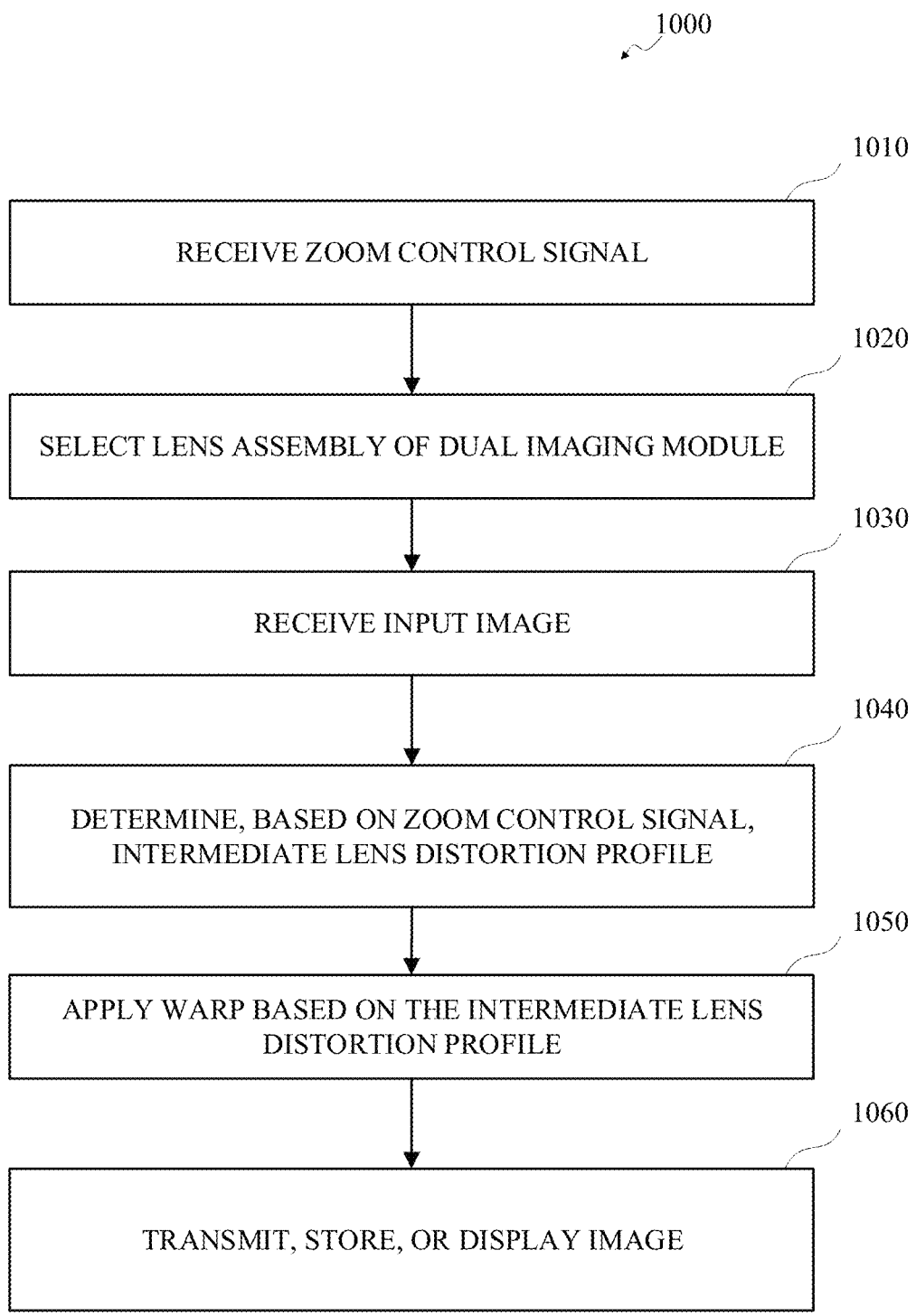
FIG. 10 is flowchart of an example of a process for capturing an image with a dual imaging module.

The image capture system 300, including the processing apparatus 312, may be configured to implement some or all of the processes described in this disclosure, such as the process 1000 of FIG. 10. For example, the processing apparatus 312 may be attached to an image sensor of the first lens assembly 314 and/or an image sensor of the second lens assembly 316 via a body and/or other components of the image capture device 310.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes a first lens assembly 342 and a second lens assembly 344 that are configured to capture images. The image capture device 340 includes a communications interface 346 configured to transfer images via the communication link 350 to the personal computing device 360. Image data from the first lens assembly 342 and the second lens assembly 344 may be passed to other components of the image capture device 340 via the bus 348.

The personal computing device 360 includes a processing apparatus 362 that is configured to receive, using the communications interface 366, images captured using the first lens assembly 342 and/or the second lens assembly 344. The processing apparatus 362 may be configured to perform image signal processing (e.g., filtering, tone mapping, stitching, and/or encoding) to generate output images based on image data from the first lens assembly 342 and/or the second lens assembly 344.

The image sensors of the first lens assembly 342 and the second lens assembly 344 are configured to detect light of a certain spectrum (e.g., the visible spectrum or the infrared spectrum) and convey information constituting an image as electrical signals (e.g., analog or digital signals). For example, the image sensors may include CCDs or active pixel sensors in a CMOS. The image sensors may detect light incident through a respective lens (e.g., hyper-hemispherical lens, a fisheye lens, or a rectilinear lens). In some implementations, the image sensors of the first lens assembly 342 and the second lens assembly 344 include digital-to-analog converters. The first lens assembly 342 and the second lens assembly 344 may be attached (e.g., via a body of the image capture device 340) and held in a fixed orientation with respective fields of view that overlap. For example, a second field of view of the second lens assembly 344 may be a subset of a first field of view of the first lens assembly 342. For example, the first lens assembly 342 and the second lens assembly 344 may be components of a dual imaging module (e.g., the dual imaging module 200 of FIG. 2).

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the first lens assembly 342 and/or the second lens assembly 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM. In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., zoom control, start recording video, stop recording video, or snap photograph) received via the user interface 364 may be passed on to the image capture device 340 via the communications link 350.

The image capture device 340 and/or the personal computing device 360, including the processing apparatus 362, may be configured to implement some or all of the processes described in this disclosure, such as the process 1000 of FIG. 10.

Figure 4:
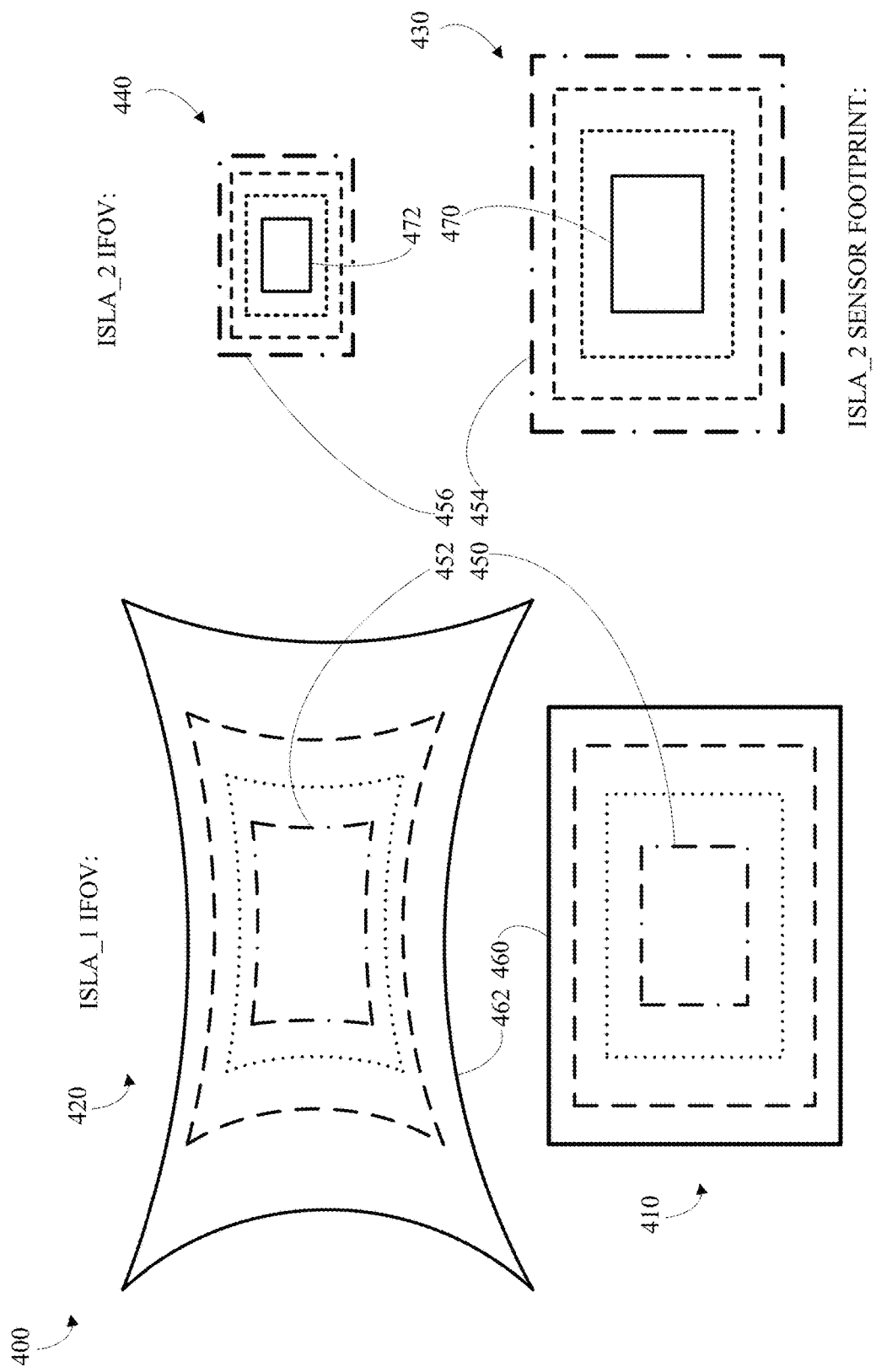
FIG. 4 is an illustration of field of views for two lens assemblies of an example of a dual imaging module.

FIG. 4 is an illustration of field of views 400 for two lens assemblies of an example of a dual imaging module. The field of views 400 shown include a set of concentric sensor footprints 410 for a first lens assembly (e.g., the first lens assembly 202 of FIG. 2), each corresponding to a different zoom level in a first set of zoom levels. The field of views 400 shown include a set of concentric instantaneous field of views (IFOVs) 420 for the first lens assembly, each corresponding to one of the zoom levels in the first set of zoom levels. The field of views 400 shown include a set of concentric sensor footprints 430 for a second lens assembly (e.g., the second lens assembly 204 of FIG. 2), each corresponding to a different zoom level in a second set of zoom levels. The field of views 400 shown include a set of concentric instantaneous field of views (IFOVs) 440 for the second lens assembly, each corresponding to one of the zoom levels in the second set of zoom levels.

FIG. 4 illustrates a progression of IFOV, with corresponding sensor footprints, for a sequence of zoom levels that are implemented across the two lens assemblies of the dual imaging module to achieve significant zoom levels with limited reduction in resolution. In FIG. 4, field of views and sensor footprints corresponding to a common zoom level are drawn using a common line style (e.g., dashes and dots). The sensor footprint 450 of the sensor footprints 410, the IFOV 452 of the IFOVs 420, the sensor footprint 454 of the sensor footprints 430, and the IFOV 456 of the IFOVs 440 all correspond to a common zoom level that is a transition zoom level, at which the dual imaging module is configured to switch from the first lens assembly to the second lens assembly as the zoom level is increased, or to switch from the second lens assembly to the first lens assembly as the zoom level is decreased. The sensor footprint 460 of the sensor footprints 410, and the IFOV 462 of the IFOVs 420 correspond to a common zoom level that corresponds to a full field of view for the dual imaging module. The sensor footprint 470 of the sensor footprints 430, and the IFOV 472 of the IFOVs 440 correspond to a common zoom level that is a maximum zoom level for the dual imaging module, corresponding to a smallest IFOV.

Figure 5:
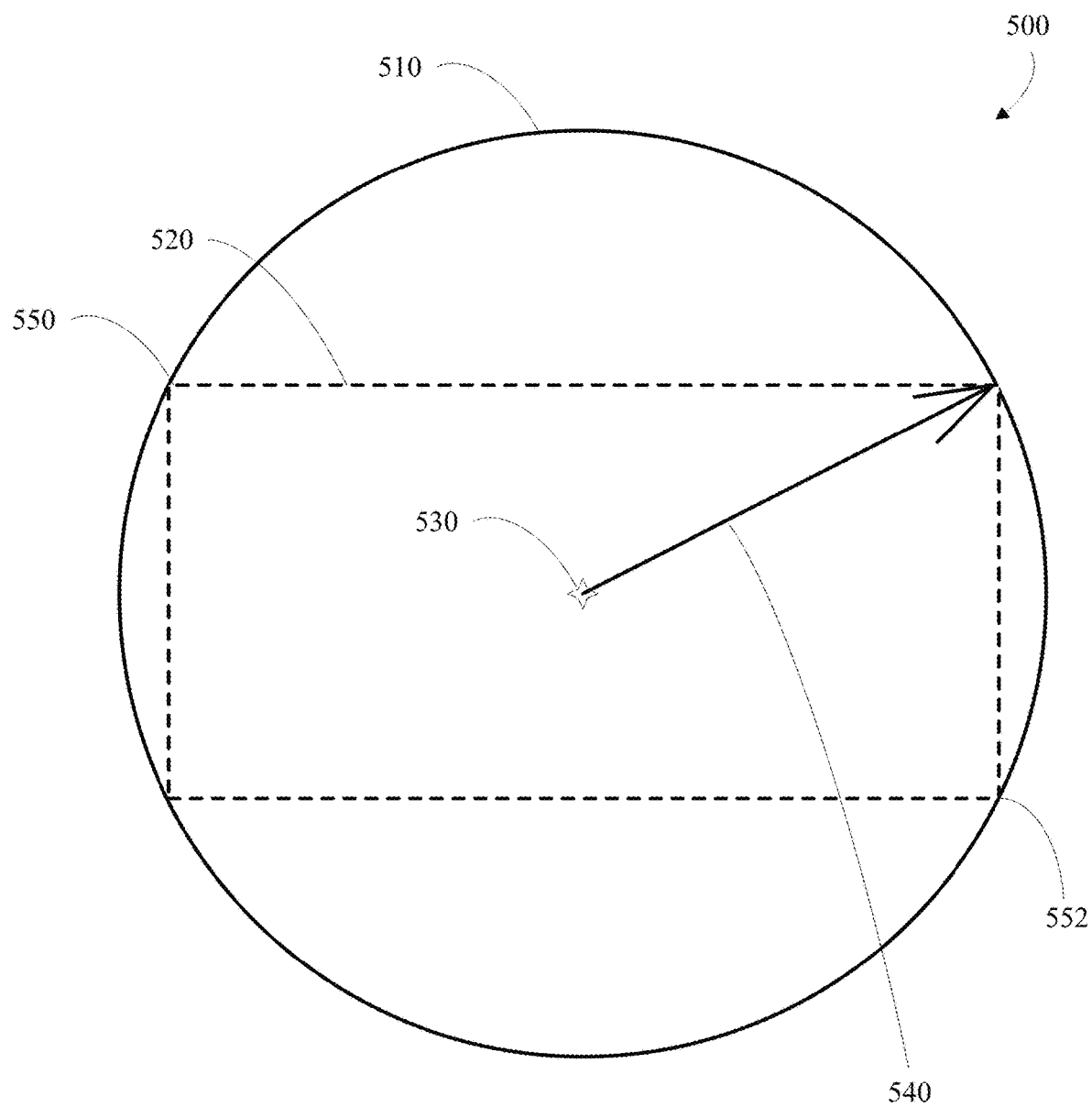
FIG. 5 is an illustration of an example of a lens distortion profile.

FIG. 5 is an illustration of an example of a lens distortion profile 500. For example, one way to model the lens properties in an optical camera system (e.g., the first lens assembly 202 or the second lens assembly 204 of FIG. 2) is to determine the optical center 530 location in the imaging system, and then calibrate the radial distortion profile from the optical center 530 to the edge of the image circle 510 for the optical system. The maximum image circle 510 from a lens stack of the optical imaging system maps to a normalized radius of 1.0 and/or a radius of 2500 pixels from the optical center 530. The image circle 510 encompasses the captured input image 520 that reflects the coverage of a pixel imaging sensor of the optical camera system. The radial dimension can be normalized to the "nominal" corner distance shown by the radial arrow 540 from the optical center 530, which would be assigned a value of 1.0 for the maximum radius, and the optical center 530 of the image being assigned a radius of 0.0 and having optical coordinates of (0.0, 0.0) in the optical distortion space. At some point in the warp transformation, these may be assigned pixel values. For example, the pixel 550 in the upper left corner of the input image 520 may have the pixel coordinates (0, 0) and, in an example input image of size 4000×3000 pixels (X, Y dimensions), the pixel 552 in the lower right corner may have the pixel coordinates (3999, 2999). Thus, the optical center 530 may have a "nominal" optical center 530 of (2000, 1500) in pixel coordinates. If the optical system is calibrated, then the calibrated optical center (true optical center) may be slightly different than this. The radius from the "nominal" optical center 530 to any one of the 4 corners would be at a distance of 2500 pixels using the Pythagorean Theorem. In this example, the radial arrow 540 goes from 0° at the optical center 530 to 80° for half of the imaging systems field of view (HFOV), and from 0.0 to 1.0 for normalized radius.

Figure 6:
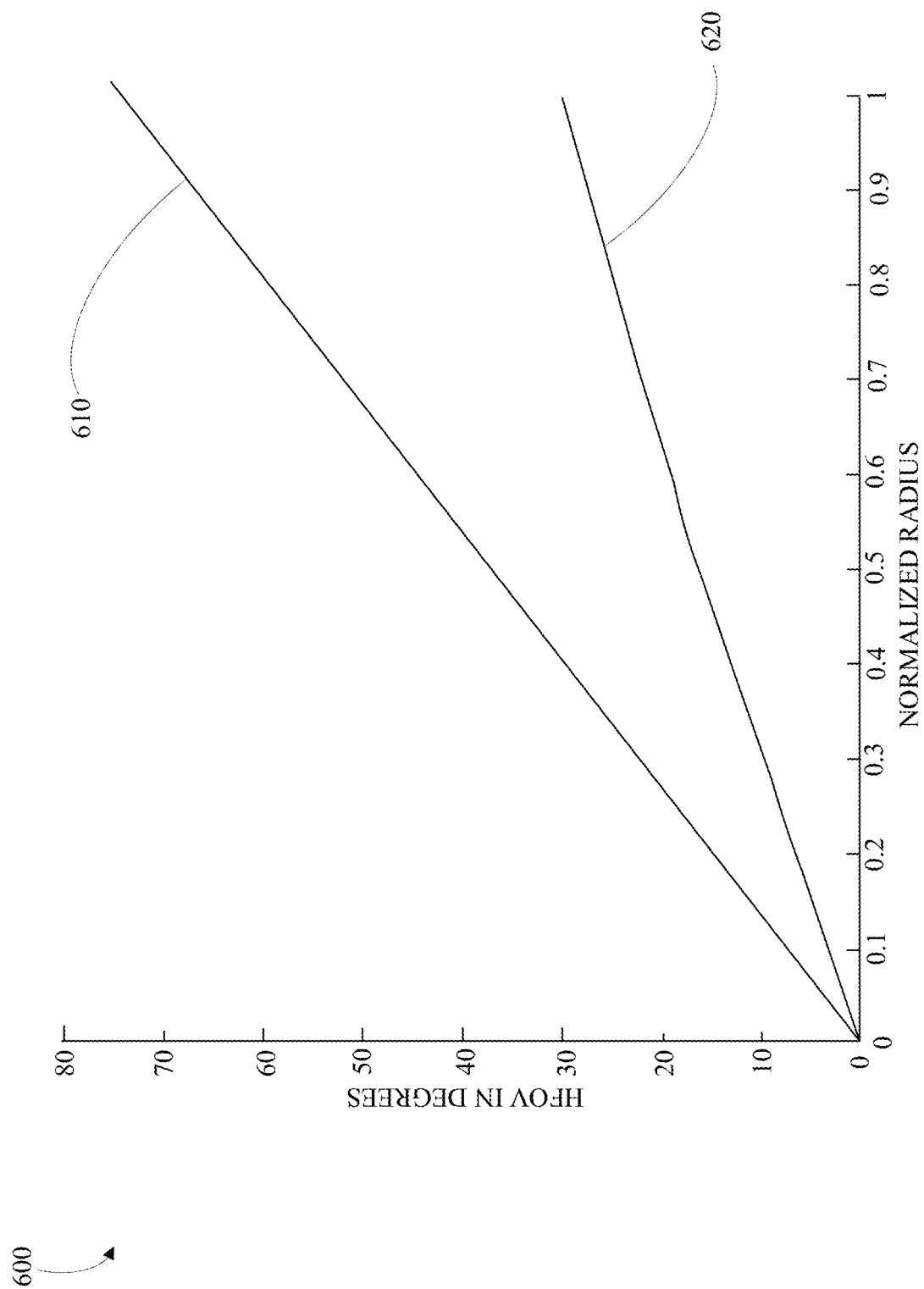
FIG. 6 is a plot of lens distortion profiles for two lens assemblies of a dual imaging module.

FIG. 6 is a plot 600 of lens distortion profiles (610 and 620) for two lens assemblies of a dual imaging module (e.g., the dual imaging module 200 of FIG. 2). The horizontal axis of the plot 600 shows normalized radius from an optical center (e.g., the optical center 530). The vertical axis of the plot 600 shows the half field of view (HFOV) in degrees. In FIG. 5, the radial arrow 540, pointing from the optical center 530 to the upper right corner would represent a radial lens distortion profile slice. For example, plotting the FOV vs. Normalized radius (0.0 to 1.0) for a lens assembly including a wide-angle lens may result in the first lens distortion profile 610 (a straight line) for F(Theta) barrel distortion, and the second lens distortion profile 620 (a curve) representing rectilinear distortion of a second lens assembly.

The wider angle FOV lens may have something similar to the linear plot for the first lens distortion profile 610, and the smaller angle FOV lens may have a shape very close to the curve for the second lens distortion profile 620. For example, an objective may include to interpolate lens distortion profiles in between the line of the first lens distortion profile 610 and the curve of the second lens distortion profile 620 for non-existent intermediate lens distortion that may be used to warp an input image so as to provide a smooth transition on lens distortion as a zoom level of the dual imaging system is changed.

Figure 7:
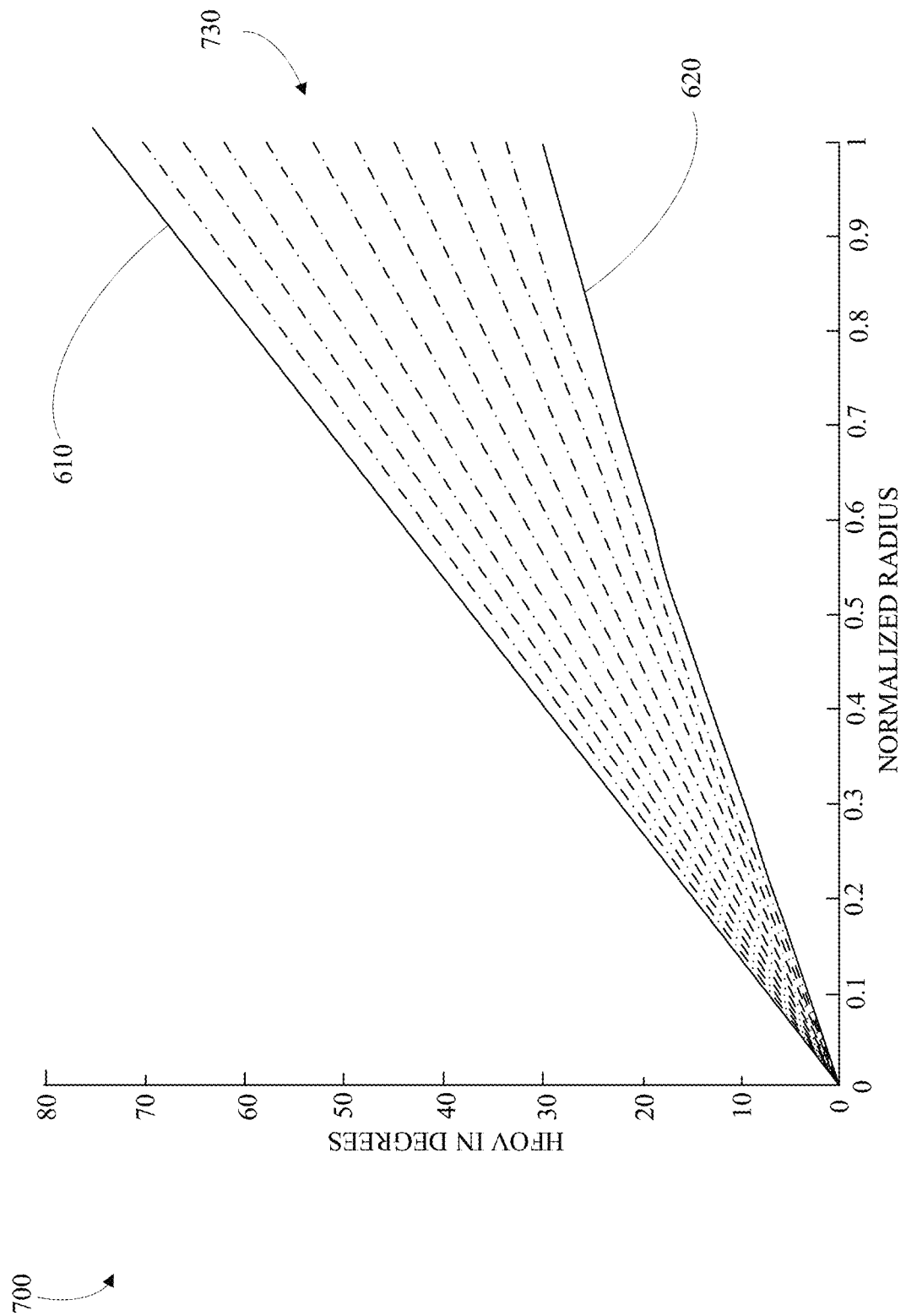
FIG. 7 is a plot of intermediate lens distortion profiles between lens distortion profiles for two lens assemblies of a dual imaging module.

FIG. 7 is a plot 700 of intermediate lens distortion profiles 730 between lens distortion profiles for two lens assemblies of a dual imaging module. The horizontal axis of the plot 700 shows the normalized radius from an optical center (e.g., the optical center 530). The vertical axis of the plot 700 shows the half field of view (HFOV) in degrees. The intermediate lens distortion profiles 730 are depicted as dashed plots with field of view angles between corresponding values of the first lens distortion profile 610 (e.g., of a wide-angle, F(Theta) lens assembly) and the second lens distortion profile 620 (e.g., of a lens assembly including a rectilinear lens). For example, the intermediate lens distortion profiles 730 may be interpolated (e.g. linearly interpolated) between the first lens distortion profile 610 and the second lens distortion profile 620.

In the example of FIG. 7, some vertically interpolated intermediate lens distortion profiles 730 are between the first lens distortion profile 610 (e.g., F(Theta) barrel distortion) and the second lens distortion profile 620 (e.g., rectilinear lens distortion). Nine interpolated intermediate lens distortion profiles 730 are shown in FIG. 7. In some implementations, in a camera that will be warping from one lens system's distortion to a secondary lens system's distortion, there may be hundreds of pre-computed lens distortion profiles for every zoom step between one lens system and the other.

For example, a technique for determining one of the intermediate lens distortion profiles 730 may include:

1.) Computing a table of 101 equally spaced entries from radius (R) of 0.0 to 1.0.
2.) For the F(Theta) or Wide-angle lens distortion, compute the FOV value for each of the 101 R values.
3.) For the Rectilinear distortion, pick a target FOV as your final zoomed in FOV (in the sample below ½ the full FOV may be 30 degrees).
4.) For the target Rectilinear FOV, compute the FOV value for each of the 101 R values.
5.) Determine the number of zoom steps desired for a smooth transition of the lens distortion across zoom levels (e.g., the example of FIG. 7 has 10 zoom steps).
6.) Compute the difference in FOV between the F(Theta) distortion curve and the Rectilinear distortion curve.
7.) Depending on the zoom step, compute a new lens distortion profile table by taking a fraction (between 0.0 and 1.0) of the difference between the first lens distortion profile 610 and the second lens distortion profile 620, and then adding that to the second lens distortion profile 620 (e.g., a rectilinear distortion.

When representing and generating lens distortion profile models a common way to represent them making it easy to apply them when zooming from one lens module to the other may be useful. For example, the intermediate lens distortion profile can be represented as a polynomial function of R (with R being the normalized distance from an optical center):

$$\theta(R)=a_1R+a_2R^2+a_3R^3+a_4R^4+a_5R^5+a_6R^6+a_7R^7+\ldots$$

which is a polynomial with no constant term (i.e., no $a_0R^0$ or no $a_0$). The order of the polynomial expansion can go as high as one likes to make it. For example, the order of the polynomial may be set to six or seven, which may correspond to a point of diminishing returns in model accuracy. Also, the inverse of the intermediate lens distortion profile may be very useful, so we may compute another polynomial for the inverse direction. For example:

$$R(\theta)=b_1\theta+b_2\theta^2+b_3\theta^3+b_4\theta^4+b_5\theta^5+b_6\theta^6+b_7\theta^7+\ldots$$

For example, the coefficients: $a_1, a_2, a_3, \ldots$, and $b_1, b_2, b_3, \ldots$ may be computed by using interpolated points along the interpolated lens distortion curves and use least squares error reduction techniques to determine the polynomial coefficients for each of the lens distortion profiles and/or their inverse. For a zoom step, a warp using an intermediate lens distortion profile that does not exist but helps to gradually transition a warp from one lens distortion of one imaging system to the other.

In some implementations, warping is an output driven process. Regardless of the expected output geometry, the output image space (destination) may be divided up into equal sized output rectangular grid tiles. Usually, they all have the same output dimensions in pixels; however, in some cases the edge (peripheral) tiles might have different dimensions, in pixels, than the tiles on the inside of the output image space, but they follow the same set of grid lines. For example, tile dimensions may be a power of 2 in size (but not required) like 128×64, or 64×128, or 64×64 pixels.

At each of the output grid point nodes we compute the corresponding input grid point nodes where the same image feature locations would be in the input (source) image. Depending on the complexity of the math to compute source image coordinates from the output image coordinates, the number of computations can be quite complex with many multiplications, divisions, or other higher order function operations. However, computational resources may be conserved by only computing these coordinate transforms with high accuracy at the grid point locations. All other input coordinates may be interpolated in between the locations of the grid point nodes using interpolation techniques. In some implementations, the interpolation math can be as simple as a single multiply and add operation to compute all the interpolation source image addresses.

Figure 8:
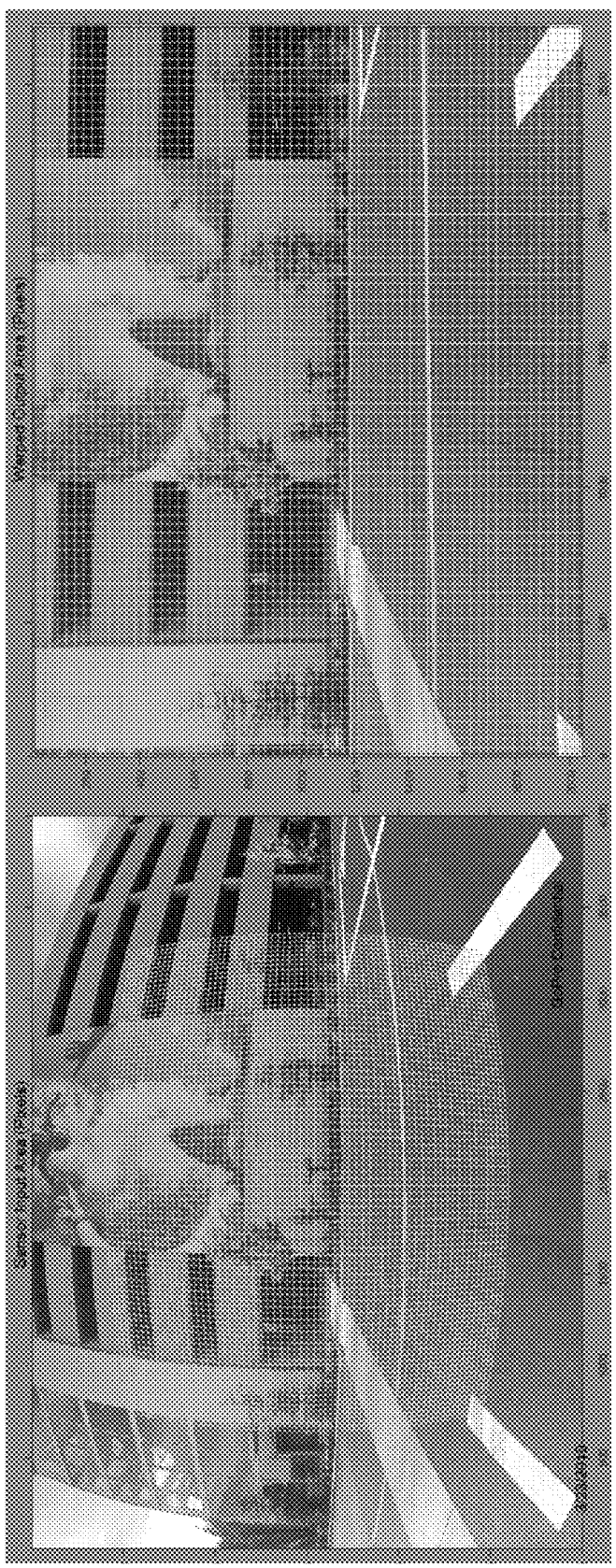
FIG. 8 is an illustration of an example of an input image and corresponding output image obtained by application of warp with lens distortion correction.

FIG. 8 is an illustration of an example of an input image 810 and a corresponding output image 820 obtained by application of warp with lens distortion correction. In this example, a warp is used to transform from an input image 810 with barrel distortion to an output image 820 that is rectilinear. Input image 810 (e.g., a source) has a geometry that is modeled via a measured (e.g., calibrated) optical center and lens distortion profile. The output image 820 (e.g., a destination) may have a geometry can be "defined" mathematically (e.g., rectilinear in FIG. 8), or it could be the calibrated distortion of a secondary imaging system. Grid intersections in the output image 820 on right side, map to corresponding grid locations in the input image 810 on the left side.

Figure 9:
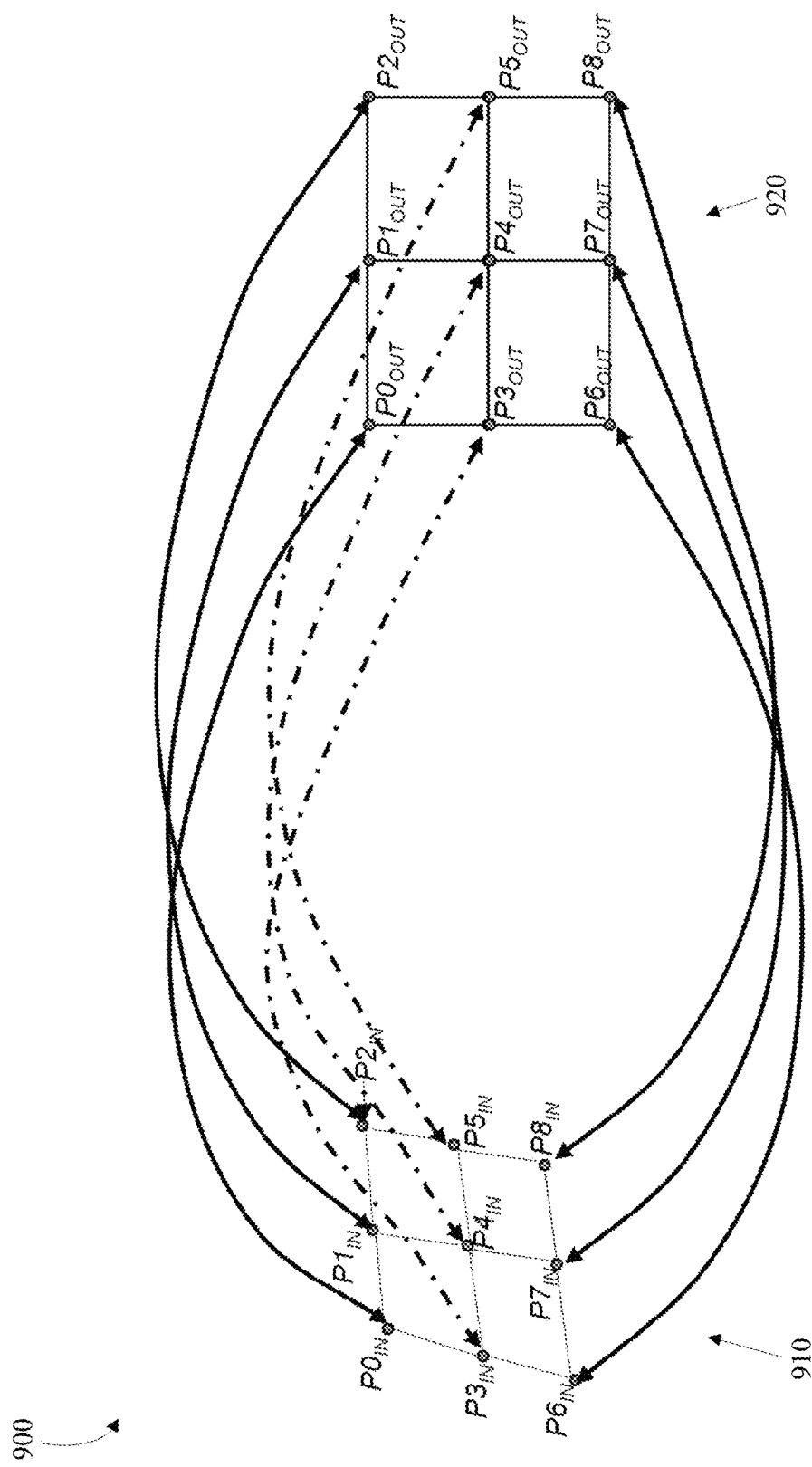
FIG. 9 is an illustration of grid point mapping in an example of warp with lens distortion correction.

FIG. 9 is an illustration of grid point mapping in an example of a warp 900 with lens distortion correction. Grid points 910 in a source image (e.g., the input image 810) are mapped to corresponding grid points 920 of a destination image (e.g., the output image 820). The double arrow curves show the correspondence between the grid points: $P0_{IN} \ominus P0_{OUT}$; $P1_{IN} \rightarrow P1_{OUT}$; $P2_{IN} \rightarrow P2_{OUT}$; $P3_{IN} \rightarrow P3_{OUT}$; $P4_{IN} \rightarrow P4_{OUT}$; $P5_{IN} \rightarrow P5_{OUT}$; $P6_{IN} \rightarrow P6_{OUT}$; $P7_{IN} \rightarrow P7_{OUT}$; $P8_{IN} \rightarrow P8_{OUT}$.

FIG. 10 is flowchart of an example of a process 1000 for capturing an image with a dual imaging module (e.g., the dual imaging module 103 of FIGS. 1A-D). The process 1000 includes receiving 1010 a zoom control signal; selecting 1020 a lens assembly of a dual imaging module; receiving 1030 an input image that was captured using the selected lens assembly of the dual imaging module; determining 1040, based on the zoom control signal, an intermediate lens distortion profile; applying 1050 a warp based on the intermediate lens distortion profile to the input image to obtain an output image; and transmitting, storing, or displaying 1060 an image based on the output image. For example, the process 1000 may be implemented using the image capture device 100 of FIGS. 1A-D. For example, the process 1000 may be implemented using the image capture system 300 of FIG. 3A. For example, the process 1000 may be implemented using the image capture system 330 of FIG. 3B.

The process 1000 includes receiving 1010 a zoom control signal. For example, the zoom control signal may be received 1010 via a user interface (e.g., the user interface 320 or the user interface 364). For example, the zoom control signal may be received 1010 from the interactive display 120 responsive to a user interacting with a virtual slider for controlling zoom level that is displayed in the interactive display 120. For example, the zoom control signal may be received 1010 via a communications interface (e.g., the communications interface 346 or the communications interface 366) from an external device.

The process 1000 includes selecting 1020 a lens assembly of a dual imaging module based on the zoom control signal. For example, where a dual imaging module includes a first lens assembly including a first stack of one or more lenses and a first image sensor configured to capture images in a first field of view; and a second lens assembly, attached to the first lens assembly, including a second stack of one or more lenses and a second image sensor configured to capture images in a second field of view that is a subset of the first field of view, the second lens assembly may be selected if a field of view correspond to the zoom control signal is completely within the second field of view and, otherwise, the first lens assembly may be selected.

The process 1000 includes receiving 1030 an input image (e.g., a still image or a frame of video) that was captured using the selected lens assembly (e.g., the first lens assembly 202 or the second lens assembly 204) of a dual imaging module (e.g., the dual imaging module 200). The selected lens assembly may be part of an image capture device (e.g., the image capture device 100, the image capture device 310, or the image capture device 340). For example, the input image may be received 1030 from an image sensor of the selected lens assembly via a bus (e.g., the bus 324). In some implementations, the input image may be received 1030 via a communications link (e.g., the communications link 350). For example, the input image may be received 1030 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the input image may be received 1030 via communications interface 366. For example, the input image may be received 1030 via a front ISP that performs some initial processing on the received 1030 input image. For example, the input image may represent each pixel value in a defined format, such as in a RAW image signal format, a YUV image signal format, or a compressed format (e.g., an MPEG or JPEG compressed bitstream). For example, the input image may be stored in a format using the Bayer color mosaic pattern. In some implementations, the input image may be a frame of video.

For example, a dual imaging module may include a first lens assembly including a first stack of one or more lenses and a first image sensor configured to capture images in a first field of view; and a second lens assembly, attached to the first lens assembly, including a second stack of one or more lenses and a second image sensor configured to capture images in a second field of view that is a subset of the first field of view. For example, the first stack of one or more lenses may include a wide-angle lens (e.g., the outer lens 230). For example, the first stack of one or more lenses may include a spherical lens. For example, the first stack of one or more lenses may include a hyper-hemispherical lens. For example, the first stack of one or more lenses may include an F(Theta) lens. For example, the second stack of one or more lenses may include a rectilinear lens (e.g., the outer lens 280). For example, the received 1030 input image may have been captured using the first image sensor. For example, the received 1030 input image may have been captured using the second image sensor.

The process 1000 includes determining 1040, based on the zoom control signal, an intermediate lens distortion profile. The intermediate lens distortion profile (e.g., one of the intermediate lens distortion profiles 730 of FIG. 7) has values that are between corresponding values of a first lens distortion profile for the first lens assembly and a second lens distortion profile for a second lens assembly of the dual imaging module. In some implementations, the intermediate lens distortion profile is stored as a polynomial that represents a radial distortion (e.g., the radial distortion along the radial arrow 540 of FIG. 5) and maps a radial distance to a field of view angle. For example, determining 1040 the intermediate lens distortion profile may include selecting intermediate lens distortion profile from a set of saved intermediate lens distortion profiles based on the zoom control signal. For example, the process 1100 of FIG. 11 may be implemented to determine the intermediate lens distortion profile. For example, the process 1200 of FIG. 12 may be implemented to determine the intermediate lens distortion profile.

The process 1000 includes applying 1050 a warp based on the intermediate lens distortion profile to the input image to obtain an output image. For example, the warp may include a lens distortion correction transform based on the intermediate lens distortion profile. For example, the process 1300 of FIG. 13 may be implemented to determine the warp based on the intermediate lens distortion profile. In some implementations, the warp also includes additional transforms; such as, for example, an electronic rolling shutter correction transform and/or an electronic image stabilization rotation.

The process 1000 includes transmitting, storing, or displaying 1060 an image based on the output image. For example, the image may be transmitted 1060 to an external device (e.g., a personal computing device) for display or storage. For example, the image may be the same as the output image. For example, the image may be compressed using an encoder (e.g., an MPEG encoder). For example, the image may be transmitted 1060 via the communications interface 318. For example, the image may be displayed 1060 in the user interface 320 or in the user interface 364. For example, the image may be stored 1060 in memory of the processing apparatus 312 or in memory of the processing apparatus 362.

The process 1000 may be repeated for multiple input images (e.g., frames of video) and multiple zoom control signals corresponding to multiple zoom levels across a supported zoom range of the dual imaging module. This may be done in various ways to smooth the transition of lens distortion as the zoom level is changed across the zoom range. In some implementations, the intermediate lens distortion profiles determined 1040 are only used for images captured using the first lens assembly. For example, intermediate lens distortion profiles may be used to gradually change the lens distortion across zoom levels that use images captured with the first lens assembly that are below a transition zoom level, at and above which the second lens assembly (e.g., including a rectilinear lens) is selected 1020 for capturing images without using an intermediate lens distortion profile. In some implementations, the intermediate lens distortion profiles determined 1040 are only used for images captured using the second lens assembly. For example, intermediate lens distortion profiles may be used to gradually change the lens distortion across zoom levels that use images captured with the second lens assembly that are above a transition zoom level, at and below which the first lens assembly (e.g., including a wide-angle lens) is selected 1020 for capturing images without using an intermediate lens distortion profile (e.g., with barrel distortion). In some implementations, the intermediate lens distortion profiles determined 1040 are used for images captured using the first lens assembly and for images captured using the second lens assembly. For example, intermediate lens distortion profiles may be used to gradually change the lens distortion across zoom levels that use images captured with the first lens assembly (e.g., including a wide-angle lens) that are below a transition zoom level, at and above which the second lens assembly (e.g., including a rectilinear lens) is selected 1020 for capturing images using intermediate lens distortion profiles to gradually continue the change of the lens distortion on the both sides of the transition zoom level. For example, where the process 1000 has been implemented to use a first intermediate lens distortion profile, determined based on a first zoom control signal, with an image received 1030 from an image sensor of the first lens assembly, the process 1000 may be repeated to receive 1010 a second zoom control signal; receive 1030 a second input image that was captured using the second image sensor (of the second lens assembly); determine 1040, based on the second zoom control signal, a second intermediate lens distortion profile; and apply 1050 a second warp based on the second intermediate lens distortion profile to the second input image to obtain a second output image. The second intermediate lens distortion profile has values that are between corresponding values of the first lens distortion profile and the second lens distortion profile. For example, the second intermediate lens distortion profile may have values that are closer to corresponding values of the second lens distortion profiles than corresponding values of the first intermediate lens distortion profile.

The relationship between a received 1010 zoom control signals and received 1030 input images may be one-to-one or one-to-many, i.e., a zoom control signal can apply to one or more subsequent images (e.g., frames of video). Thus, one instance of receiving 1010 a zoom control signal may give rise to multiple instances of the process 1000.

Figure 11:
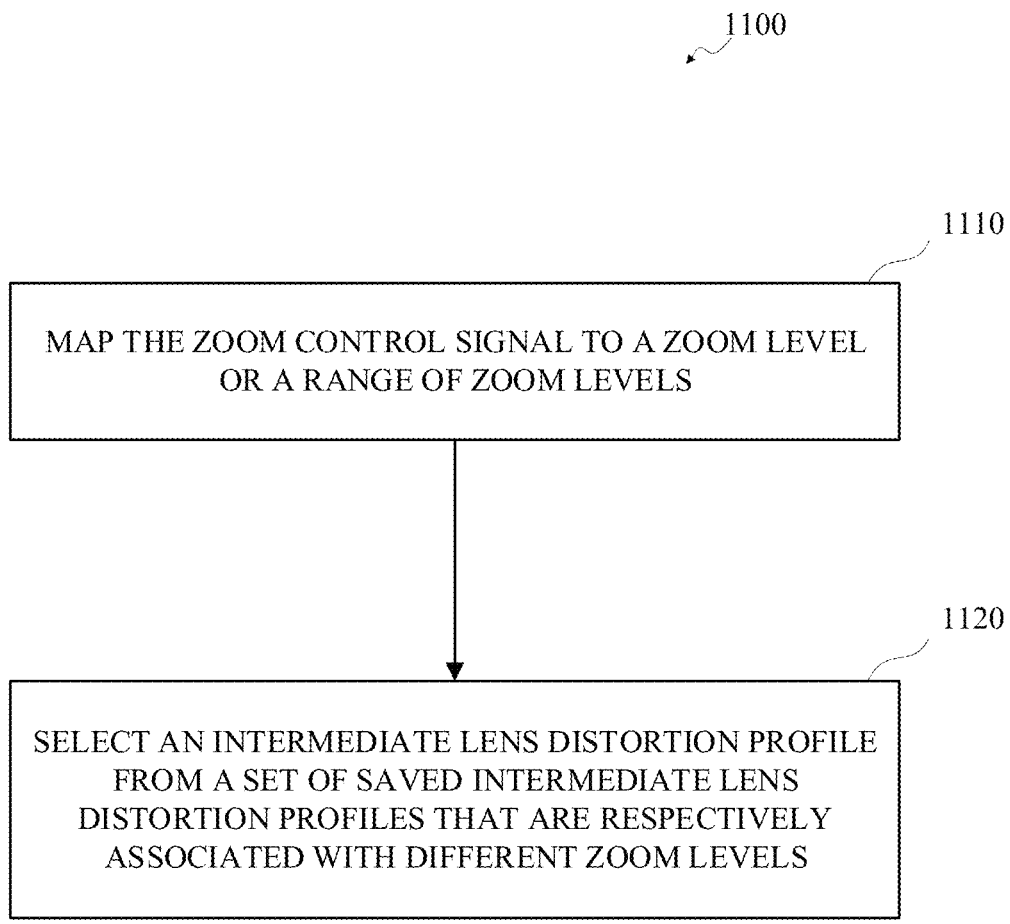
FIG. 11 is flowchart of an example of a process for determining an intermediate lens distortion profile based on a zoom control signal.

FIG. 11 is flowchart of an example of a process 1100 for determining an intermediate lens distortion profile based on a zoom control signal. The process 1100 includes mapping 1110 the zoom control signal to a zoom level or a range of zoom levels; and selecting 1120 the intermediate lens distortion profile from a set of saved intermediate lens distortion profiles that are respectively associated with different zoom levels. For example, the process 1100 may be implemented using the image capture device 100 of FIGS. 1A-D. For example, the process 1100 may be implemented using the image capture system 300 of FIG. 3A. For example, the process 1100 may be implemented using the image capture system 330 of FIG. 3B.

The process 1100 includes mapping 1110 the zoom control signal to a zoom level or a range of zoom levels. In some implementations, mapping 1110 the zoom control signal to a zoom level or a range of zoom levels includes quantizing the zoom control signal. In some implementations, the zoom control signal may be a differential signal, and the zoom level may be determined by incrementing or decrementing a current zoom level by a number of levels that is determined based on the zoom control signal.

The process 1100 includes selecting 1120 the intermediate lens distortion profile from a set of saved intermediate lens distortion profiles that are respectively associated with different zoom levels. For example, the intermediate lens distortion profile associated with the zoom level that the zoom control signal mapped to may be selected 1120 for use in a warp. For example, the selected 1120 lens distortion profile may be selected 1120 for use with a current input image and/or for use with images (e.g., frames of video) captured later until a new zoom control signal is received.

Figure 12:
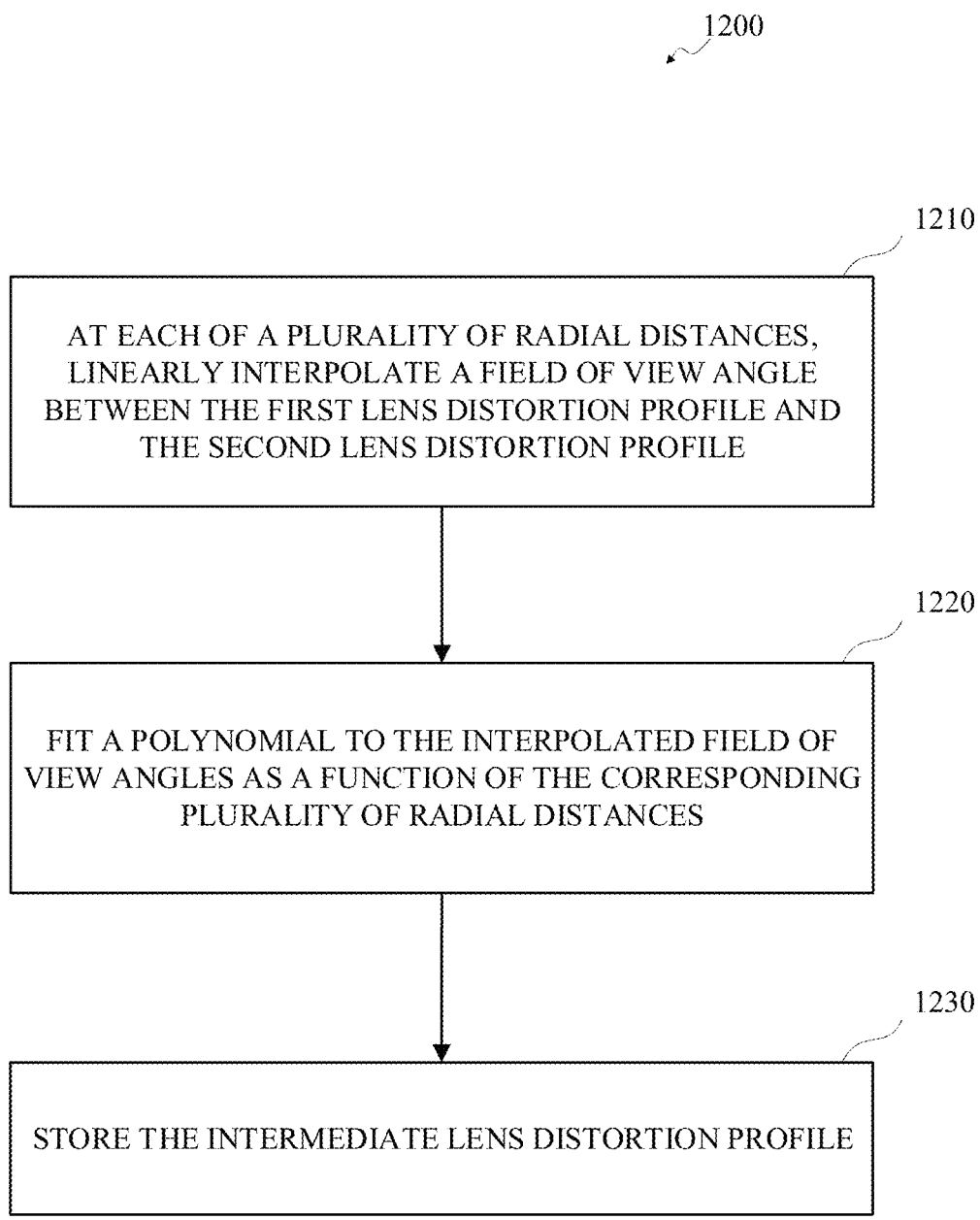
FIG. 12 is flowchart of an example of a process for determining an intermediate lens distortion profile.

FIG. 12 is flowchart of an example of a process 1200 for determining an intermediate lens distortion profile. The process 1200 includes at each of a plurality of radial distances, linearly interpolating 1210 a field of view angle between a corresponding field of view angle of the first lens distortion profile and a corresponding field of view angle of the second lens distortion profile; fitting 1220 a polynomial to the interpolated field of view angles as a function of the corresponding plurality of radial distances; and storing 1230 the intermediate lens distortion profile. For example, the process 1200 may be implemented by the image capture device 100 of FIGS. 1A-D. For example, the process 1200 may be implemented by the image capture system 300 of FIG. 3A. For example, the process 1200 may be implemented by the image capture system 330 of FIG. 3B. For example, the process 1200 may be implemented by another computing device and the stored 1230 intermediate lens distortion profile may be transferred to an image capture system (e.g., the image capture system 300 or the image capture system 330) for storage and use in future image capture.

The process 1200 includes, at each of a plurality of radial distances, linearly interpolating 1210 a field of view angle between a corresponding field of view angle of the first lens distortion profile and a corresponding field of view angle of the second lens distortion profile. For example, the field of view angle at each of the plurality of radial distances may be determined as: $\theta_{intermediate} = \alpha*(\theta_{wide-angle} - \theta_{rectilinear}) + \theta_{rectilinear}$, where $\theta_{wide-angle}$ is the corresponding field of view angle of the first lens distortion profile, $\theta_{rectilinear}$ is the corresponding field of view angle of the second lens distortion profile, and $\alpha$ is a constant across the plurality of radial distances for this intermediate lens distortion profile. For example, the value of $\alpha$ may be determined based on a zoom level, with different $\alpha$ values corresponding to different intermediate lens distortion profiles in a set of intermediate lens distortion profiles (e.g., the set of intermediate lens distortion profiles 730 of FIG. 7) between the lens distortion profiles of the lens assemblies of a dual-imaging module.

The process 1200 includes fitting 1220 a polynomial to the interpolated field of view angles as a function of the corresponding plurality of radial distances. For example, the intermediate lens distortion profile can be represented as a function of R (with R being the distance from an optical center):

$$\theta(R) = a_1 R + a_2 R^2 + a_3 R^3 + a_4 R^4 + a_5 R^5 + a_6 R^6 + a_7 R^7 + \ldots$$

which is a polynomial with no constant term (i.e., no $a_0 R^0$ or no $a_0$). The order of the polynomial expansion can go high as one likes to make it. For example, the order of the polynomial may be set to six or seven, which may correspond to a point of diminishing returns in model accuracy. Also, the inverse of the intermediate lens distortion profile may be very useful, so we may compute another polynomial for the inverse direction. For example:

$$R(\theta) = b_1 \theta + b_2 \theta^2 + b_3 \theta^3 + b_4 \theta^4 + b_5 \theta^5 + b_6 \theta^6 + b_7 \theta^7 + \ldots$$

For example, the coefficients: $a_1, a_2, a_3, \ldots$, and $b_1, b_2, b_3, \ldots$ may be computed by using interpolated 1210 points along the interpolated 1210 lens distortion curves and use least squares error reduction techniques to determine the polynomial coefficients for each of the lens distortion profiles and/or their inverse.

The process 1200 includes storing 1230 the intermediate lens distortion profile. For example, the intermediate lens distortion profile may be stored 1230 as a set of polynomial coefficients. For example, the intermediate lens distortion profile may be stored 1230 for use when an associated zoom level is indicated by a received zoom control signal. For example, the stored 1230 intermediate lens distortion profile may be accessed and used to determine a warp based on the intermediate lens distortion profile, which can be applied to one or more input images (e.g., still images or frames of video).

Figure 13:
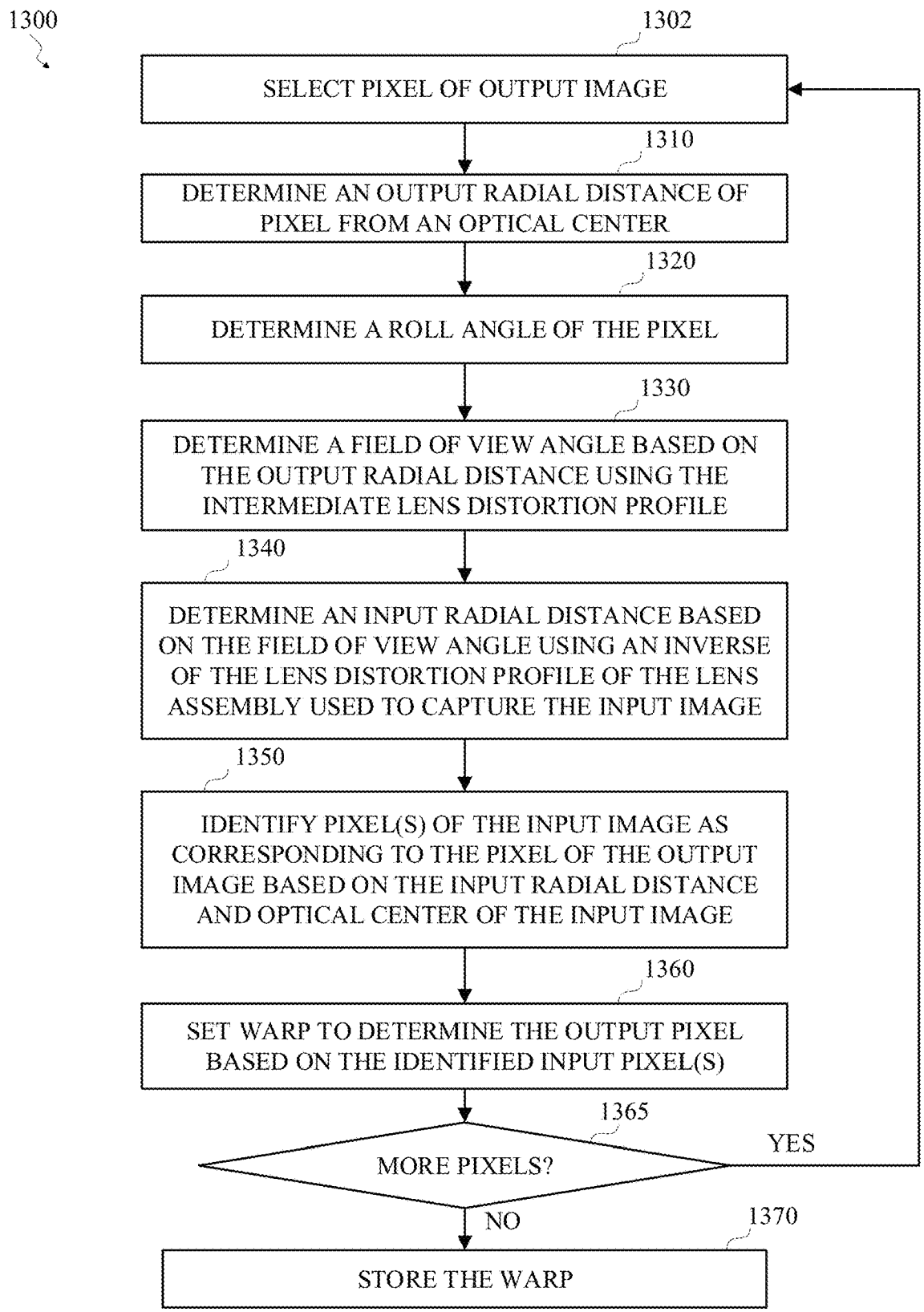
FIG. 13 is flowchart of an example of a process for determining a warp based on an intermediate lens distortion profile for a dual imaging module.

FIG. 13 is flowchart of an example of a process 1300 for determining a warp based on an intermediate lens distortion profile for a dual imaging module. The process 1300 includes selecting 1302 a pixel of an output image; determining 1310 an output radial distance of the pixel of the output image from an optical center of the output image; determining 1320 a roll angle of the pixel of the output image; determining 1330 a field of view angle based on the output radial distance using the intermediate lens distortion profile; determining 1340 an input radial distance based on the field of view angle using an inverse of the first lens distortion profile; identifying 1350 one or more pixels of the input image as corresponding to the pixel of the output image based on the input radial distance and an optical center of the input image; set 1360 the warp to determine the pixel of the output image based on the one or more pixels of the input image that were identified; and, when 1365 all the output pixels have been mapped, storing 1370 the warp. For example, the process 1300 may be implemented by the image capture device 100 of FIGS. 1A-D. For example, the process 1300 may be implemented by the image capture system 300 of FIG. 3A. For example, the process 1300 may be implemented by the image capture system 330 of FIG. 3B. For example, the process 1300 may be implemented by another computing device and the stored 1370 warp may be transferred to an image capture system (e.g., the image capture system 300 or the image capture system 330) for storage and use in future image capture when the intermediate lens distortion profile is selected for use with an input image.

The process 1300 includes selecting 1302 a pixel of an output image. For example, the pixels of the output may be selected in a raster order. For example, the selected 1302 pixel may be specified by its pixel coordinates in the output image: $(R_{OUT}, Y_{OUT})$.

The process 1300 includes determining 1310 an output radial distance of the pixel of the output image from an optical center of the output image. For example, the output radial distance may be determined as: $R_{OUT}=\text{sqrt}((X_{OUT}-Cx_{OUT})^2+(Y_{OUT}-Cy_{OUT})^2)$, where $(CX_{OUT}, Cy_{OUT})$ are pixel coordinates of the optical center of the output image. For example, the optical center of the output may be set to be the center of the output frame where $(Cx_{OUT}, Cy_{OUT})$ are half of the output dimensions. In some implementations, the output radial distance is determined 1310 as a normalized output radial distance: $R_{OUT\_NORM}=R_{Out}/R_{NORMALIZER\_OUT}$, where $R_{NORMALIZER\_OUT}$ is the longest distance of any pixel in the output image to the optical center (e.g., the distance to the furthest corner pixel).

The process 1300 includes determining 1320 a roll angle of the pixel of the output image. For example, the roll angle may be determined 1320 as pair of values including a sine and a cosine of the roll angle. For example, roll angle φ may be determined 1320 as:

$$\cos(\varphi)=(X_{OUT}-Cx_{OUT})/R_{OUT}, \text{ and } \sin(\varphi)=(Y_{OUT}-Cy_{OUT})/R_{OUT}.$$

The process 1300 includes determining 1330 a field of view angle based on the output radial distance using the intermediate lens distortion profile. For example, the field of view angle θ may be determined 1330 as: $\theta=\text{ILDP}(R_{OUT\_NORM})$, where ILDP( ) is the intermediate lens distortion profile. In some implementations, the intermediate lens distortion profile may be stored and applied as a polynomial. In some implementations, the intermediate lens distortion profile may be stored and applied as a look-up table.

The process 1300 includes determining 1340 an input radial distance based on the field of view angle using an inverse of the lens distortion profile of the lens assembly that was used to capture the input image. (e.g., the first lens distortion profile or the second lens distortion profile). For example, where the first lens assembly (e.g., including a wide-angle lens) was used to capture the input image, the input radial distance may be determined 1340 as: $R_{IN}=R_{NORMALIZER\_IN}*\text{inv\_LDP\_WideAngle}(\theta)$, where inv_LDP_WideAngle( ) is the inverse lens distortion profile of the first lens assembly and $R_{NORMALIZER\_IN}$ is the longest distance of any pixel in the input image to the optical center (e.g., the distance to the furthest corner pixel).

The process 1300 includes identifying 1350 one or more pixels of the input image as corresponding to the pixel of the output image based on the input radial distance and an optical center of the input image. In some implementations, a single pixel of the input image is identified 1350 using the pixel coordinates corresponding to the input radial distance $(R_{IN})$ and the roll angle (φ). For example, the input pixel coordinates may be determined as: $X_{IN}=Cx_{IN}+R_{IN}\cos(\varphi)$, and $Y_{IN}=Cy_{IN}+R_{IN}\sin(\varphi)$, where $(Cx_{IN}, Cy_{IN})$ are pixel coordinates of the optical center of the input image. A pixel of the input at these coordinates may be identified 1350 as corresponding to the pixel of the output image. In some implementations, a group of pixels in a vicinity of these coordinates may be identified 1350 as corresponding to the pixel of the output image.

The process 1300 includes setting 1360 the warp to determine the pixel of the output image based on the one or more pixels of the input image that were identified. For example, the warp may be set 1360 to calculate the output pixel value based on the pixel values of the one or more pixels of the input that have been identified 1350. For example, the warp may be set 1360 to calculate the value of the pixel of the output image as weighted average of the group of pixels of the input image that are identified 1350.

If (at operation 1365) there are more pixels of the output image to be processed, then the next pixel of the output image is selected 1302 and the process 1300 continues. In some implementations, only a subset of the pixels of the output image in a grid are selected 1302, and the remaining pixels of the output image are matched to pixels of the input image by interpolation between corresponding grid points of the input image.

When (at operation 1365) there are no more pixels of the output image to be processed, then the warp that maps identified pixels of the input image to corresponding pixels of the output image is stored 1370 for later use. In some implementations, the warp may be modified to incorporate additional transformations (e.g., an electronic rolling shutter correction transform and/or an electronic image stabilization rotation) before it is applied to the input image to obtain the output image.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. For example, a non-transitory computer-readable storage medium may include executable instructions that, when executed by a processor, cause performance of an operations to implement the process 1000 of FIG. 10, the process 1100 of FIG. 11, the process 1200 of FIG. 12, and/or the process 1300 of FIG. 13.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   a first lens assembly including a first stack of one or more lenses and a first image sensor configured to capture images in a first field of view;
   a second lens assembly, attached to the first lens assembly, including a second stack of one or more lenses and a second image sensor configured to capture images in a second field of view that is a subset of the first field of view; and
   a processing apparatus configured to:
   receive a zoom control signal;
   receive an input image that was captured using the first image sensor;
   determine, based on the zoom control signal, an intermediate lens distortion profile, wherein the intermediate lens distortion profile has values that are between corresponding values of a first lens distortion profile for the first stack of one or more lenses and a second lens distortion profile for the second stack of one or more lenses; and
   apply a warp based on the intermediate lens distortion profile to the input image to obtain an output image.

2. The system of claim 1, in which the processing apparatus is configured to determine the intermediate lens distortion profile by performing operations comprising:
   selecting the intermediate lens distortion profile from a set of saved intermediate lens distortion profiles that are respectively associated with different zoom levels.

3. The system of claim 1, in which the intermediate lens distortion profile is stored as a polynomial that represents a radial distortion and maps a radial distance to a field of view angle.

4. The system of claim 3, in which the intermediate lens distortion profile has been determined by performing operations comprising:
   at each of a plurality of radial distances, linearly interpolating a field of view angle between a corresponding field of view angle of the first lens distortion profile and a corresponding field of view angle of the second lens distortion profile; and
   fitting a polynomial to the interpolated field of view angles as a function of the corresponding plurality of radial distances.

5. The system of claim 1, in which the processing apparatus is configured to:
   receive a second zoom control signal;
   receive a second input image that was captured using the second image sensor;
   determine, based on the second zoom control signal, a second intermediate lens distortion profile, wherein the second intermediate lens distortion profile has values that are between corresponding values of the first lens distortion profile and the second lens distortion profile; and
   apply a second warp based on the second intermediate lens distortion profile to the second input image to obtain a second output image.

6. The system of claim 1, in which the processing apparatus is configured to determine the warp based on the intermediate lens distortion profile by performing operations comprising:
   determining an output radial distance of a pixel of the output image from an optical center of the output image;
   determine a field of view angle based on the output radial distance using the intermediate lens distortion profile;
   determine an input radial distance based on the field of view angle using an inverse of the first lens distortion profile;
   identify one or more pixels of the input image as corresponding to the pixel of the output image based on the input radial distance and an optical center of the input image; and
   set the warp to determine the pixel of the output image based on the one or more pixels of the input image that were identified.

7. The system of claim 1, in which the first stack of one or more lenses includes a wide-angle lens.

8. The system of claim 1, in which the first stack of one or more lenses includes a spherical lens.

9. The system of claim 1, in which the processing apparatus is configured to:
   transmit, store, or display an image based on the output image.

10. The system of claim 1, in which processing apparatus is attached to the image sensor.

11. A method comprising:
    receiving a zoom control signal;
    receiving an input image that was captured using a first lens assembly of a dual imaging module;
    determining, based on the zoom control signal, an intermediate lens distortion profile, wherein the intermediate lens distortion profile has values that are between corresponding values of a first lens distortion profile for the first lens assembly and a second lens distortion profile for a second lens assembly of the dual imaging module;
    applying a warp based on the intermediate lens distortion profile to the input image to obtain an output image; and
    transmitting, storing, or displaying an image based on the output image.

12. The method of claim 11, in which determining the intermediate lens distortion profile comprises:
    selecting the intermediate lens distortion profile from a set of saved intermediate lens distortion profiles that are respectively associated with different zoom levels.

13. The method of claim 11, in which the intermediate lens distortion profile is stored as a polynomial that represents a radial distortion and maps a radial distance to a field of view angle.

14. The method of claim 13, in which the intermediate lens distortion profile has been determined by performing operations comprising:
    at each of a plurality of radial distances, linearly interpolating a field of view angle between a corresponding field of view angle of the first lens distortion profile and a corresponding field of view angle of the second lens distortion profile; and fitting a polynomial to the interpolated field of view angles as a function of the corresponding plurality of radial distances.

15. The method of claim 11, comprising:

receiving a second zoom control signal;

receiving a second input image that was captured using the second lens assembly;

determining, based on the second zoom control signal, a second intermediate lens distortion profile, wherein the second intermediate lens distortion profile has values that are between corresponding values of the first lens distortion profile and the second lens distortion profile; and applying a second warp based on the second intermediate lens distortion profile to the second input image to obtain a second output image.

16. The method of claim 11, in which determining the warp based on the intermediate lens distortion profile comprises:

determining an output radial distance of a pixel of the output image from an optical center of the output image;

determining a field of view angle based on the output radial distance using the intermediate lens distortion profile;

determining an input radial distance based on the field of view angle using an inverse of the first lens distortion profile;

identifying one or more pixels of the input image as corresponding to the pixel of the output image based on the input radial distance and an optical center of the input image; and setting the warp to determine the pixel of the output image based on the one or more pixels of the input image that were identified.

17. The method of claim 11, in which the first lens assembly includes a wide-angle lens.

18. A system comprising:

a first lens assembly including a first stack of one or more lenses and a first image sensor configured to capture images in a first field of view;

a second lens assembly, attached to the first lens assembly, including a second stack of one or more lenses and a second image sensor configured to capture images in a second field of view that is a subset of the first field of view; and a processing apparatus configured to:

receive a zoom control signal;

receive an input image that was captured using the second image sensor;

determine, based on the zoom control signal, an intermediate lens distortion profile, wherein the intermediate lens distortion profile has values that are between corresponding values of a first lens distortion profile for the first stack of one or more lenses and a second lens distortion profile for the second stack of one or more lenses; and apply a warp based on the intermediate lens distortion profile to the input image to obtain an output image.

19. The system of claim 18, in which the first stack of one or more lenses includes a wide-angle lens.

20. The system of claim 18, in which the first stack of one or more lenses includes a spherical lens.

* * * * *